United States Patent
Abotabl et al.

(10) Patent No.: US 12,557,177 B2
(45) Date of Patent: Feb. 17, 2026

(54) TECHNIQUES FOR LINKING DOWNLINK CONTROL INFORMATION CANDIDATES ACROSS MULTIPLE TRANSMISSION AND RECEPTION POINTS WITH CELL DISCONTINUOUS TRANSMISSION OPERATIONS

(71) Applicant: QUALCOMM Incorporated, San Diego, CA (US)

(72) Inventors: Ahmed Attia Abotabl, San Diego, CA (US); Diana Maamari, San Diego, CA (US); Mostafa Khoshnevisan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 424 days.

(21) Appl. No.: 18/341,587

(22) Filed: Jun. 26, 2023

(65) Prior Publication Data
US 2024/0430978 A1    Dec. 26, 2024

(51) Int. Cl.
*H04W 72/23* (2023.01)
*H04W 72/232* (2023.01)
*H04W 76/28* (2018.01)

(52) U.S. Cl.
CPC ......... *H04W 76/28* (2018.02); *H04W 72/232* (2023.01)

(58) Field of Classification Search
CPC .............................. H04W 72/232; H04W 76/28
See application file for complete search history.

(56) References Cited

U.S. PATENT DOCUMENTS

| | | | | |
|---|---|---|---|---|
| 2022/0030577 A1* | 1/2022 | Zhou | ...................... | H04L 5/0055 |
| 2022/0368498 A1* | 11/2022 | Sun | ........................ | H04L 5/0094 |
| 2022/0377836 A1* | 11/2022 | Zhang | ............... | H04W 52/0216 |
| 2023/0046262 A1* | 2/2023 | Beale | ................ | H04W 52/0229 |
| 2023/0354327 A1* | 11/2023 | El Hamss | ............. | H04L 5/0094 |
| 2023/0362938 A1* | 11/2023 | Guo | ........................ | H04W 72/21 |
| 2023/0387992 A1* | 11/2023 | Guo | ...................... | H04B 7/088 |
| 2024/0039674 A1* | 2/2024 | Jiang | ...................... | H04L 5/0023 |
| 2024/0276528 A1* | 8/2024 | Liu | ........................ | H04L 1/1812 |
| 2024/0430969 A1* | 12/2024 | Gao | ................... | H04B 7/06964 |
| 2025/0071648 A1* | 2/2025 | Hong | ................ | H04W 36/0055 |

* cited by examiner

Primary Examiner — Andrew Lee
(74) Attorney, Agent, or Firm — Holland & Hart LLP

(57) ABSTRACT

Methods, systems, and devices for wireless communications are described. Techniques described herein provide for linking downlink control information candidates across multiple transmission and reception points (TRPs) with cell discontinuous transmission (DTX) operations. A user equipment (UE) may determine a linkage status of linked downlink control information candidates across multiple TRPs with DTX operations. The UE may determine the linkage status based on a DTX status of the first TRP or a DTX status of the second TRP. When the DTX status of the first TRP or the second TRP is activated, the UE may determine the linkage status is a broken linkage. The UE may determine the linkage status as the broken linkage if one of the downlink control information candidates is within an inactive duration of a DTX cycle. The UE may determine the linkage status as the maintained linkage or broken linkage based on DCI format.

30 Claims, 13 Drawing Sheets

TECHNIQUES FOR LINKING DOWNLINK CONTROL INFORMATION CANDIDATES ACROSS MULTIPLE TRANSMISSION AND RECEPTION POINTS WITH CELL DISCONTINUOUS TRANSMISSION OPERATIONS

FIELD OF TECHNOLOGY

The following relates to wireless communications, including techniques for linking downlink control information candidates across multiple transmission and reception points with cell discontinuous transmission operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for linking downlink control information candidates across multiple transmission and reception points with cell discontinuous transmission (DTX) operations. For example, the described techniques provide for the UE to determine a linkage status of linked downlink control information candidates across multiple transmission and reception points (TRPs) with DTX operations. The UE may determine a linkage status (e.g., whether the linkage is currently maintained or broken) of the first downlink control information candidate and the second downlink control information candidate based on a DTX status of the first TRP or a DTX status of the second TRP. When the DTX status of the first TRP or the second TRP is activated, the UE may determine the linkage status based on whether the downlink control information candidates are within active durations of the respective DTX cycles. If the first downlink control information candidate is within the active duration of the DTX cycle of the first TRP and the second downlink control information candidate is within the inactive duration of the DTX cycle of the second TRP, the linkage status may be a broken linkage. In some examples, the UE may determine the linkage status as a maintained linkage or a broken linkage based on a downlink control information format.

A method for wireless communications by a user equipment (UE) is described. The method may include receiving first control signaling indicating a first downlink control channel candidate from a first transmission and reception point (TRP) is associated with a second downlink control information candidate from a second TRP and monitoring one or both of the first downlink control information candidate and the second downlink control information candidate according to a linkage status of the first downlink control information candidate and the second downlink control information candidate, where the linkage status is based on a first discontinuous transmission (DTX) status of the first TRP, a second DTX status of the second TRP, a downlink control information format, or a combination thereof.

A UE for wireless communications is described. The UE may include one or more memories storing processor executable code, and one or more processors coupled with the one or more memories. The one or more processors may individually or collectively operable to execute the code to cause the UE to receive first control signaling indicating a first downlink control channel candidate from a first transmission and reception point (TRP) is associated with a second downlink control information candidate from a second TRP and monitor one or both of the first downlink control information candidate and the second downlink control information candidate according to a linkage status of the first downlink control information candidate and the second downlink control information candidate, where the linkage status is based on a first discontinuous transmission (DTX) status of the first TRP, a second DTX status of the second TRP, a downlink control information format, or a combination thereof.

Another UE for wireless communications is described. The UE may include means for receiving first control signaling indicating a first downlink control channel candidate from a first transmission and reception point (TRP) is associated with a second downlink control information candidate from a second TRP and means for monitoring one or both of the first downlink control information candidate and the second downlink control information candidate according to a linkage status of the first downlink control information candidate and the second downlink control information candidate, where the linkage status is based on a first discontinuous transmission (DTX) status of the first TRP, a second DTX status of the second TRP, a downlink control information format, or a combination thereof.

A non-transitory computer-readable medium storing code for wireless communications is described. The code may include instructions executable by a processor to receive first control signaling indicating a first downlink control channel candidate from a first transmission and reception point (TRP) is associated with a second downlink control information candidate from a second TRP and monitor one or both of the first downlink control information candidate and the second downlink control information candidate according to a linkage status of the first downlink control information candidate and the second downlink control information candidate, where the linkage status is based on a first discontinuous transmission (DTX) status of the first TRP, a second DTX status of the second TRP, a downlink control information format, or a combination thereof.

Some examples of the method, user equipment (UEs), and non-transitory computer-readable medium described herein may further include operations, features, means, or instructions for receiving second control signaling indicating the first DTX status may be an active DTX status, the linkage status of the first downlink control information candidate and the second downlink control information candidate being a broken linkage based on the active DTX status.

Some examples of the method, user equipment (UEs), and non-transitory computer-readable medium described herein may further include operations, features, means, or instructions for receiving third control signaling indicating a first DTX cycle including an active duration and an inactive duration of the first TRP such that the first downlink control information candidate may be within the inactive duration and where monitoring one or both of the first downlink control information candidate and the second downlink control information candidate includes monitoring the second downlink control information candidate, where the first downlink control information candidate may be not linked with the second downlink control information candidate based on the broken linkage.

In some examples of the method, user equipment (UEs), and non-transitory computer-readable medium described herein, monitoring one or both of the first downlink control information candidate and the second downlink control information candidate may include operations, features, means, or instructions for monitoring the first downlink control information candidate and the second downlink control information candidate, where the first downlink control information candidate may be not linked with the second downlink control information candidate based on the broken linkage.

Some examples of the method, user equipment (UEs), and non-transitory computer-readable medium described herein may further include operations, features, means, or instructions for receiving second control signaling indicating the first DTX status may be an active DTX status and indicating a first DTX cycle including a first active duration and a first inactive duration of the first TRP and receiving third control signaling indicating the second DTX status may be an active DTX status and indicating a second DTX cycle including a second active duration and a second inactive duration of the second TRP; the linkage status of the first downlink control information candidate and the second downlink control information candidate being a maintained linkage based on the first downlink control information candidate being within the first active duration and the second downlink control information candidate being within the second active duration.

In some examples of the method, user equipment (UEs), and non-transitory computer-readable medium described herein, monitoring one or both of the first downlink control information candidate and the second downlink control information candidate may include operations, features, means, or instructions for monitoring the first downlink control information candidate and the second downlink control information candidate, where the first downlink control information candidate may be linked with the second downlink control information candidate based on the maintained linkage.

Some examples of the method, user equipment (UEs), and non-transitory computer-readable medium described herein may further include operations, features, means, or instructions for receiving second control signaling indicating the first DTX status may be an active DTX status and indicating a first DTX cycle including a first active duration and a first inactive duration of the first TRP and receiving third control signaling indicating the second DTX status may be an active DTX status and indicating a second DTX cycle including a second active duration and a second duration of the second TRP; the linkage status of the first downlink control information candidate and the second downlink control information candidate being a maintained linkage based on the first downlink control information candidate being within the first active duration and the second downlink control information candidate being within the second inactive duration.

In some examples of the method, user equipment (UEs), and non-transitory computer-readable medium described herein, monitoring one or both of the first downlink control information candidate and the second downlink control information candidate may include operations, features, means, or instructions for monitoring the first downlink control information candidate and the second downlink control information candidate, where the first downlink control information candidate may be linked with the second downlink control information candidate based on the maintained linkage.

Some examples of the method, user equipment (UEs), and non-transitory computer-readable medium described herein may further include operations, features, means, or instructions for receiving second control signaling indicating the first DTX status may be an active DTX status and indicating a first DTX cycle including a first active duration and a first inactive duration of the first TRP and receiving third control signaling indicating the second DTX status may be an active DTX status and indicating a second DTX cycle including a second active duration and a second duration of the second TRP; the linkage status of the first downlink control information candidate and the second downlink control information candidate being a broken linkage based on the first downlink control information candidate being within the first active duration and the second downlink control information candidate being within the second inactive duration.

In some examples of the method, user equipment (UEs), and non-transitory computer-readable medium described herein, monitoring one or both of the first downlink control information candidate and the second downlink control information candidate may include operations, features, means, or instructions for monitoring the first downlink control information candidate and dropping the second downlink control information candidate, where the first downlink control information candidate may be not linked with the second downlink control information candidate based on the broken linkage.

Some examples of the method, user equipment (UEs), and non-transitory computer-readable medium described herein may further include operations, features, means, or instructions for receiving second control signaling indicating the downlink control information format and receiving third control signaling indicating the DTX status of the first TRP may be an active DTX status; the linkage status of the first downlink control information candidate and the second downlink control information candidate being a maintained linkage based on the downlink control information format.

Some examples of the method, user equipment (UEs), and non-transitory computer-readable medium described herein may further include operations, features, means, or instructions for receiving second control signaling indicating the downlink control information format and receiving third control signaling indicating the DTX status of the first TRP may be an active DTX status; the linkage status of the first downlink control information candidate and the second downlink control information candidate being a broken linkage based on the downlink control information format.

Some examples of the method, user equipment (UEs), and non-transitory computer-readable medium described herein may further include operations, features, means, or instructions for receiving second control signaling indicating the downlink control information format, receiving third control signaling indicating the first DTX status may be an active DTX status and indicating a first DTX cycle including a first active duration and a first inactive duration of the first TRP, and receiving fourth control signaling indicating the second DTX status may be an active DTX status and indicating a second DTX cycle including a second active duration and a second inactive durations of the second TRP; the linkage status of the first downlink control information candidate and the second downlink control information candidate being a maintained linkage based on the downlink control information format and on the first downlink control information candidate being within the first active duration and the second downlink control information candidate being within the second inactive duration.

Some examples of the method, user equipment (UEs), and non-transitory computer-readable medium described herein may further include operations, features, means, or instructions for receiving second control signaling indicating the downlink control information format, receiving third control signaling indicating the first DTX status may be an active DTX status and indicating a first DTX cycle including a first active duration and a first inactive duration of the first TRP, and receiving fourth control signaling indicating the second DTX status may be an active DTX status and indicating a second DTX cycle including a second active duration and a second inactive durations of the second TRP; the linkage status of the first downlink control information candidate and the second downlink control information candidate being a broken linkage based on the downlink control information format and based on the first downlink control information candidate being within the first active duration and the second downlink control information candidate being within the second inactive duration.

DETAILED DESCRIPTION

Figure 1:
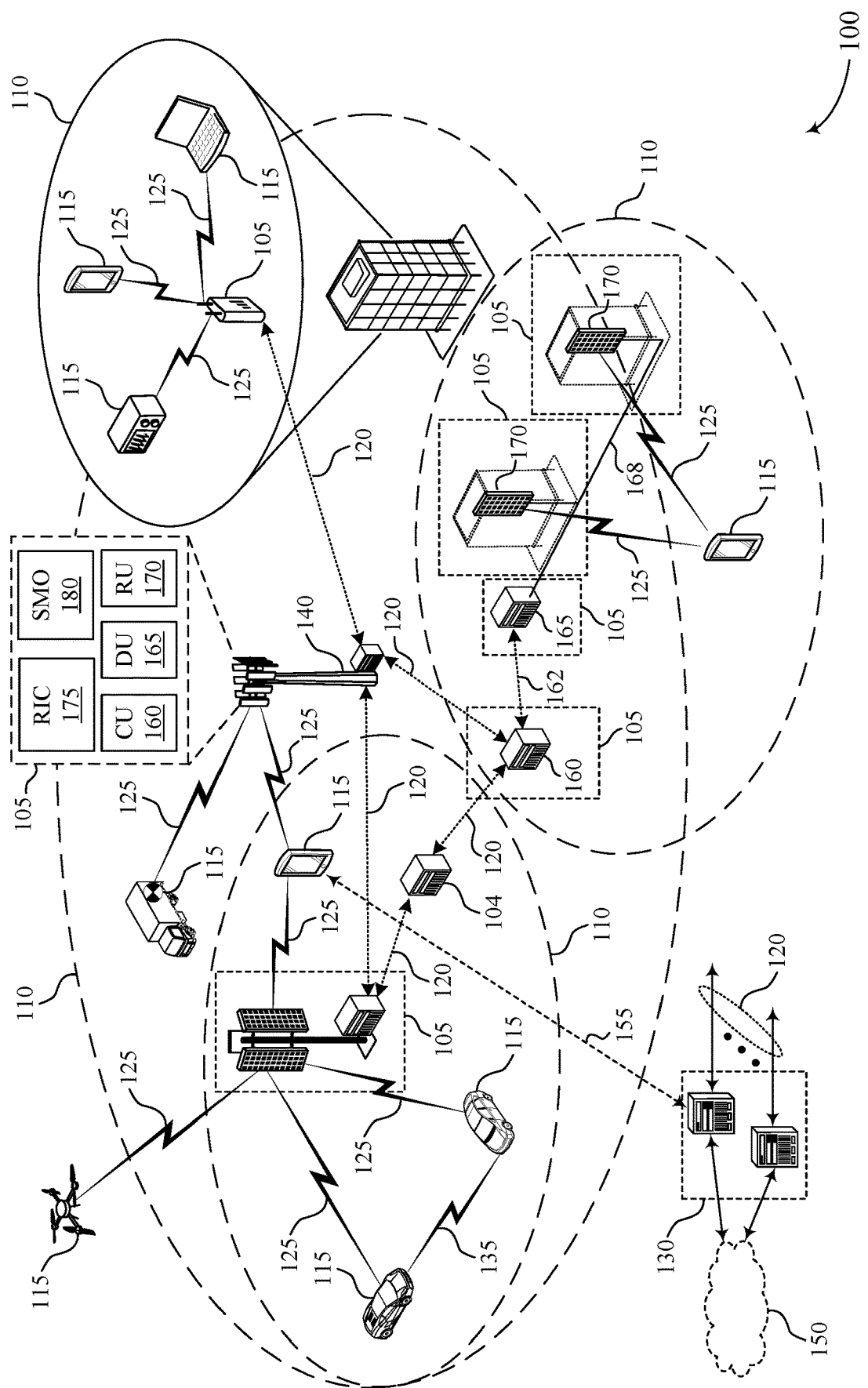
FIG. 1 shows an example of a wireless communications system that supports techniques for linking downlink control information candidates across multiple transmission and reception points (TRPs) with cell discontinuous transmission (DTX) operations in accordance with one or more aspects of the present disclosure.

Some wireless communications systems may include a network entity that communicates with a user equipment (UE). In some examples, the network entity may include more than one transmission and reception point (TRP) that communicate with the UE. When the UE operates in a multiple TRP (mTRP) mode, a transmission of downlink control information from a first TRP may be linked to the same downlink control information transmitted from a second TRP. At the UE, a first downlink control information candidate (e.g., first PDCCH candidate) for the first TRP may be linked to a second downlink control information candidate (e.g., second PDCCH candidate) for the second TRP.

In some examples, the UE may monitor the first downlink control information candidate and the second downlink control information candidate, and the UE may combine multiple receptions of the same downlink control information from the first downlink control information candidate and the second downlink control information candidate to achieve higher reception reliability.

Each TRP may implement cell discontinuous transmission (DTX) and discontinuous reception (DRX) operations to reduce energy consumption by the network entity. Depending on the configuration of each TRP DTX cycle, the linkage of the downlink control information transmissions may be broken. For example, the downlink control information candidate may be within an inactive duration of the cell DTX cycle, and the TRP may not transmit the downlink control information repetition.

Techniques for the UE to determine a linkage status of linked downlink control information candidates across multiple TRPs with DTX operations may be defined. The UE may receive control signaling indicating a first downlink control information candidate for the first TRP is associated with a second downlink control information candidate for the second TRP. The UE may determine a linkage status (e.g., maintained or broken) of the first downlink control information candidate and the second downlink control information candidate based on a DTX status of the first TRP or a DTX status of the second TRP. In one example, when the DTX status of the first TRP or the second TRP is activated, the UE may determine the linkage status is a broken linkage, and the first downlink control information candidate and the second downlink control information candidate may not be linked. When the linkage status is the broken linkage, the UE may individually monitor the first downlink control information candidate and the second downlink control information candidate without linking, or the UE may monitor the downlink control information candidates that are within an active duration of the DTX cycle. In some examples, when the cell DTX status is active, the linkage status of the downlink control information candidates may depend on which TRP is active. If the first downlink control information candidate is within the active duration of the DTX cycle of the first TRP and the second downlink control information candidate is within the inactive duration of the DTX cycle of the second TRP, the linkage status may be the broken linkage. In a further example, the UE may determine the linkage status as the maintained linkage or broken linkage based on downlink control information format.

Aspects of the disclosure are initially described in the context of wireless communications systems. Additional aspects of the disclosure are described in the context of wireless communications system, examples of an association between PDCCH candidates, an example of a cell DTX operation, an example of a cell DTX cycle and an example process flow. Aspects of the disclosure are further illustrated by and described with reference to apparatus diagrams, system diagrams, and flowcharts that relate to techniques for linking downlink control information candidates across multiple transmission and reception points with cell discontinuous transmission operations.

FIG. 1 shows an example of a wireless communications system 100 that supports techniques for linking downlink control information candidates across multiple transmission and reception points with cell discontinuous transmission operations in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for linking downlink control information candidates across multiple transmission and reception points with cell discontinuous transmission operations as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some wireless communications systems may include a network entity 105 that communicates with a UE 115. In some examples, the network entity 105 may include more than one TRP that communicate with the UE 115. When the UE 115 operates in a mTRP mode, a transmission of downlink control information from a first TRP may be linked to the same downlink control information transmitted from a second TRP. At the UE 115, a first downlink control information candidate (e.g., first PDCCH candidate) for the first TRP may be linked to a second downlink control information candidate (e.g., second PDCCH candidate) for the second TRP.

In some examples, the UE 115 may monitor the first downlink control information candidate and the second downlink control information candidate, and the UE 115 may combine multiple receptions of the same downlink control information from the first downlink control information candidate and the second downlink control information candidate to achieve higher reception reliability.

Each TRP may implement cell DTX and DRX operations to reduce energy consumption by the network entity 105. Depending on the configuration of each TRP DTX cycle, the linkage of the downlink control information transmissions may be broken. For example, the downlink control information candidate may be within an inactive duration of the cell DTX cycle, and the TRP may not transmit the downlink control information repetition.

Techniques for the UE 115 to determine a linkage status of linked downlink control information candidates across multiple TRPs with DTX operations may be defined. The UE 115 may receive control signaling indicating a first downlink control information candidate for the first TRP is associated with a second downlink control information candidate for the second TRP. The UE 115 may determine a linkage status (e.g., whether the linkage status is currently broken or maintained) of the first downlink control information candidate and the second downlink control information candidate based on a DTX status of the first TRP or a DTX status of the second TRP. In one example, when the DTX status of the first TRP or the second TRP is activated, the UE 115 may determine the linkage status is a broken linkage, and the first downlink control information candidate and the second downlink control information candidate may not be linked. When the linkage status is the broken linkage, the UE 115 may individually monitor the first downlink control information candidate and the second downlink control information candidate without linking, or the UE 115 may monitor the downlink control information candidates that are within an active duration of the DTX cycle. In some examples, when the cell DTX status is active, the linkage status of the downlink control information candidates may depend on which TRP is active. If the first downlink control information candidate is within the active duration of the DTX cycle of the first TRP and the second downlink control information candidate is within the inactive duration of the DTX cycle of the second TRP, the linkage status may be a broken linkage. In a further example, the UE 115 may determine the linkage status as a maintained linkage or broken linkage based on downlink control information format.

Figure 2:
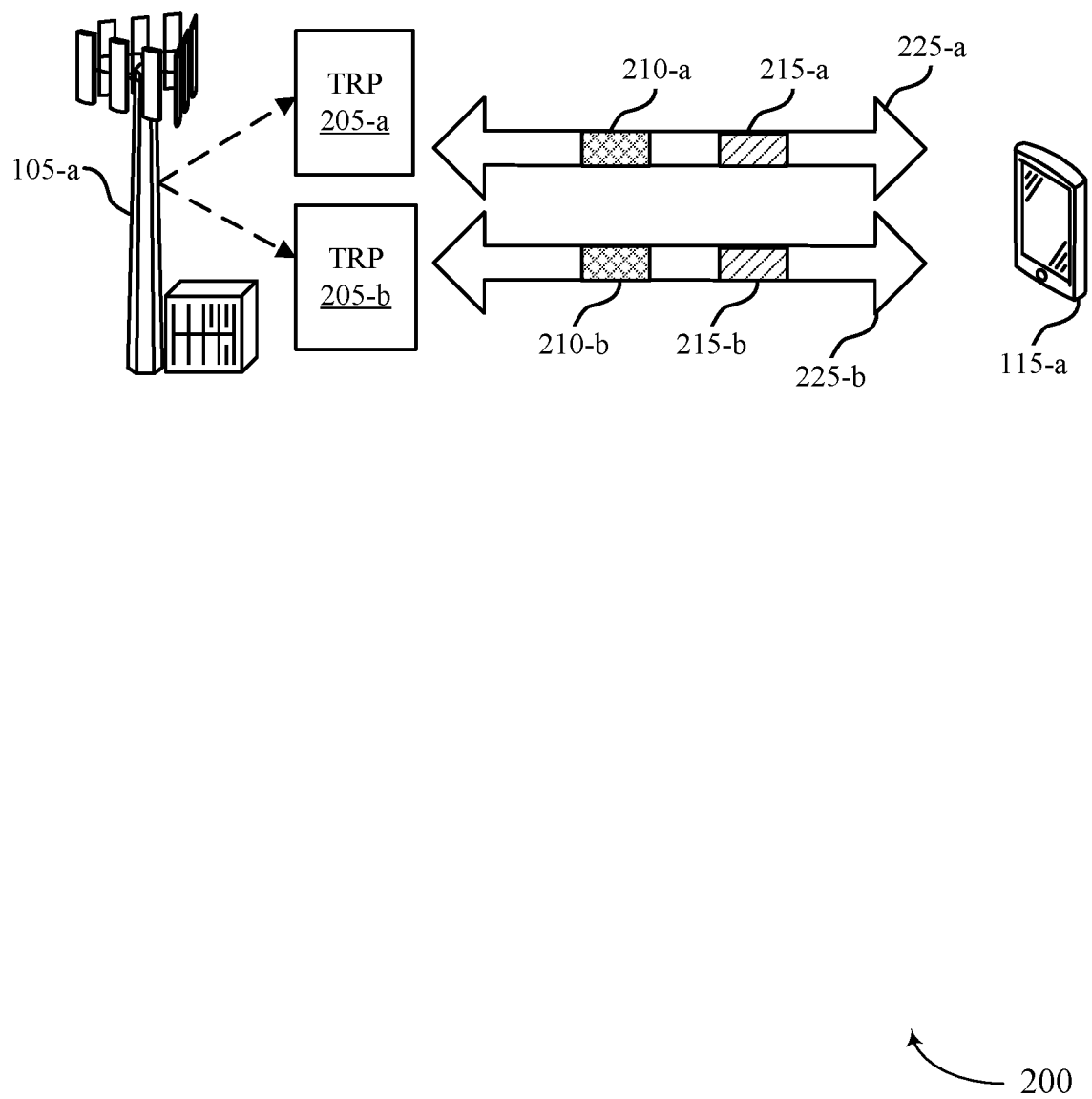
FIG. 2 shows an example of a wireless communications system that supports techniques for linking downlink control information candidates across multiple TRPs with cell DTX operations in accordance with one or more aspects of the present disclosure.

FIG. 2 shows an example of a wireless communications system 200 that supports techniques for linking downlink control information candidates across multiple TRPs with cell DTX operations in accordance with one or more aspects of the present disclosure. The wireless communications system 200 may implement one or more aspects of the wireless communications system 100. For example, the wireless communications system 200 may support signaling and configurations that support techniques for determining a linkage status of linked downlink control information candidate candidates across multiple TRPs with DTX operations.

The wireless communications system 200 may include a network entity 105-*a* and a UE 115-*a*. The UE 115-*a* may be an example of UEs 115 described with reference to FIG. 1. The network entity 105-*a* may be an example of network entities 105 described with reference to FIG. 1. The network entity 105-*a* may be associated with multiple TRPs, such as a first TRP 205-*a* and a second TRP 205-*b*.

In some aspects, the first TRP 205-*a* may communicate with the UE 115-*a* via a communication link 225-*a*. In some cases, the communication link 225-*a* may include an example of an access link (e.g., a Uu link) or a link of an Xn interface. The communication link 225-*a* may include a bi-directional link that may include both uplink and downlink communication. For example, the UE 115-*a* may transmit uplink transmissions, such as uplink control signals or uplink data signals, to the first TRP 205-*a* using the communication link 225-*a*, and the first TRP 205-*a* may transmit downlink transmissions, such as downlink control signals or downlink data signals, to the UE 115-*a* using the communication link 225-*a*. For example, the first TRP 205-*a* may transmit control signaling 210-*a* to the UE 115-*a*, and the first TRP 205-*a* may communicate one or more messages 215-*a*, such as data transmissions, with the UE 115-*a*.

Similarly, the second TRP 205-*b* may communicate with the UE 115-*a* via a communication link 225-*b*. In some cases, the communication link 225-*b* may be an example of an access link (e.g., a Uu link) or a link of an Xn interface. In some examples, the second TRP 205-*b* may transmit control signaling 210-*b* to the UE 115-*a*, and the second TRP 205-*b* may communicate one or more messages 215-*b*, such as data transmissions, with the UE 115-*a*.

In some examples, the network entity 105-*a* and UE 115-*a* may implement techniques to improve energy efficiency. A cost of network energy consumption may be approximately 23% of a total expense to run a cellular network. Most network consumed energy may be consumed by radio access network equipment. The radio access network equipment energy consumption may be estimated to be approximately 50% of the energy consumed to operate a 5G network. Network energy saving features may be desirable for adoption and expansion of cellular networks.

In some examples, the energy consumption by the network entity 105-*a* may be evaluated including the relative energy consumption for uplink and downlink transmissions by considering factors of base station load, sleep states and associated transition time. Additionally, when evaluating system-level network energy consumption and energy saving potential, assessing and balancing the impact to network and the UE 115-*a* performance may be considered including spectral efficiency, capacity, latency, handover performance, call drop rate, initial access performance, user perceived throughput, service level agreement assurance, energy efficiency, UE power consumption and complexity. In some examples, techniques by the network entity 105-*a* and the UE 115-*a* to improve network energy savings in terms of base station transmission and reception may include more efficient dynamic or semi-static operations. Finer granularity adaption of transmissions or receptions in one or more of network energy saving techniques in time, frequency, spatial and power domains may be considered with potential support or feedback from the UE 115-*a* and potential UE assistance information.

In some examples, the first TRP 205-*a* and the second TRP 205-*b* may implement cell DTX and DRX operations to reduce energy consumption by the network entity 105-a. For example, the cell DTX/DRX operation of the network entity 105-a and UE DRX of the UE 115-a may be aligned in RRC_CONNECTED mode through inter-node information exchange on cell DTX/DRX. In some examples, the first TRP 205-a and the second TRP 205-b may communicate with the UE 115-a, and the UE 115-a may operate in an mTRP mode.

The wireless communications system 200 may support the use of associated or linked downlink control information candidates for downlink control information repetitions. In some examples, the downlink control information candidates may be PDCCH candidates or other downlink control information candidates. For convenience, downlink control information candidates will be referred to PDCCH candidate. When the UE 115-a operates in a mTRP mode, a PDCCH transmission of downlink control information (DCI) from the first TRP 205-a may be linked to a PDCCH transmission of the same DCI from the second TRP 205-b. At the UE 115-a, a first PDCCH candidate for the first TRP 205-a may be linked to a second PDCCH candidate for the second TRP 205-b. The UE 115-a may monitor the first PDCCH candidate and the second PDCCH candidate, and the UE 115-a may combine multiple receptions of the same DCI from the first PDCCH candidate and the second PDCCH candidate to achieve higher reception reliability.

Figure 3:
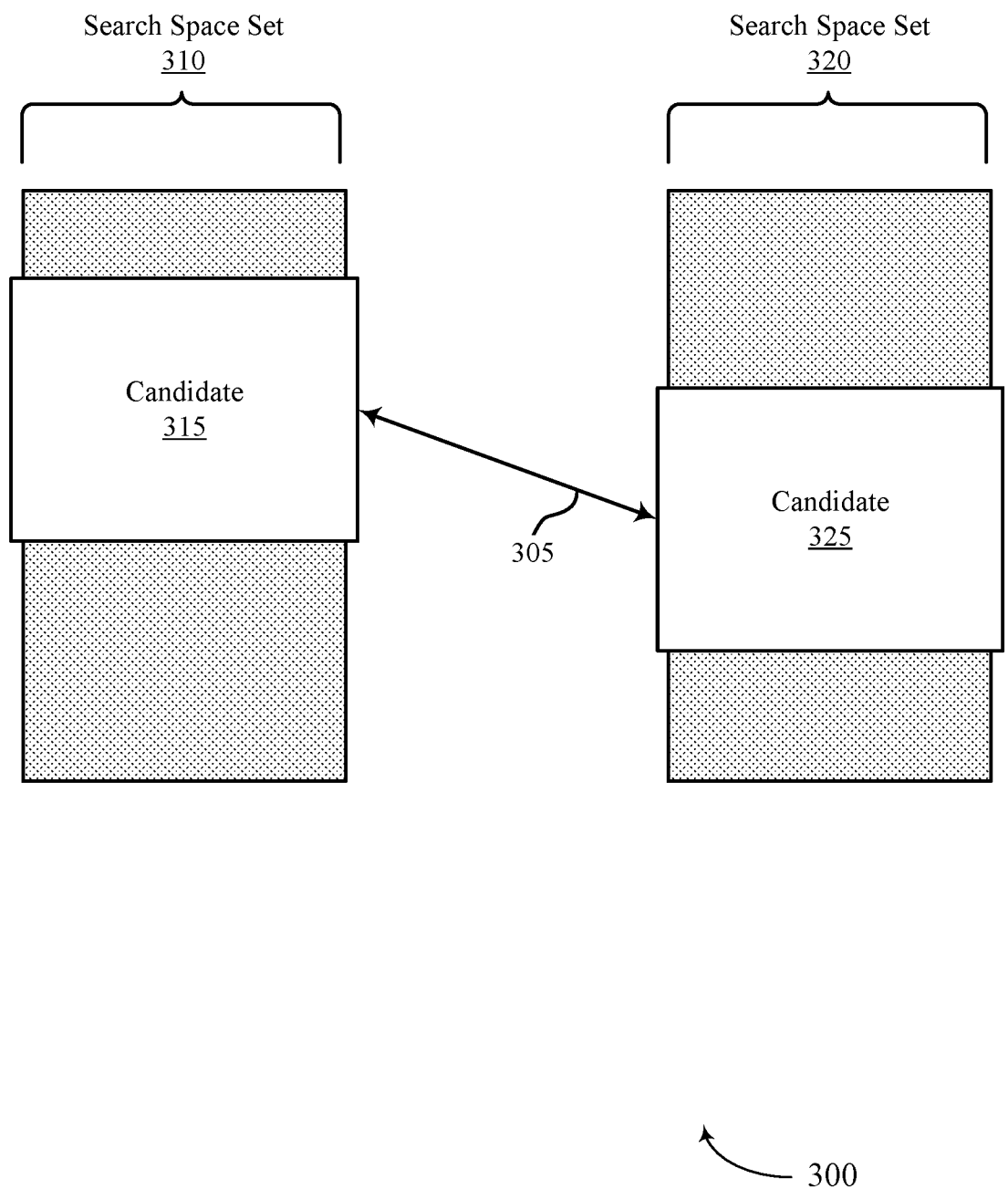
FIG. 3 shows an example of an association between downlink control information candidates that supports techniques for linking downlink control information candidates across multiple TRPs with cell DTX operations in accordance with one or more aspects of the present disclosure.

FIG. 3 shows an example of an association between downlink control information candidates 300 that supports techniques for linking downlink control information candidates across multiple TRPs with cell DTX operations in accordance with one or more aspects of the present disclosure. In some examples, the association between downlink control information candidates 300 may implement aspects of wireless communications systems 100 and 200. For example, the association between downlink control information candidates 300 may be configured by the network entity 105 or the network entity 105-a and may be signaled to the UE 115 or the UE 115-a.

In some examples, the association between downlink control information candidates 300 may include a first search space set 310, a second search space set 320, a first PDCCH candidate 315, a second PDCCH candidate 325, and an association 305 of the first PDCCH candidate 315 with the second PDCCH candidate 325. The network entity 105-a may link or associate PDCCH candidates across different search space sets and may use a set of rules to define the linking. For example, a rule may define a potential association between two different PDCCH candidates in different search space sets. The first PDCCH candidate 315 may be associated with a CORESET_i that has a TCI state 1, and the second PDCCH candidate 325 may be associated with a CORESET_j that has a TCI state 2.

In some examples, the UE 115-a may receive control signaling (e.g., control signaling 210-a or control signaling 210-b) indicating that the first PDCCH candidate 315 from the first TRP 205-a may be associated with the second PDCCH candidate 325 from the second TRP 205-b. In one example, the control signaling indicating the associated PDCCH candidates may be RRC signaling. The first TRP 205-a and the second TRP 205-b may provide PDCCH repetition by transmitting the same DCI payload at the same aggregation level with the same coded bits. The first PDCCH candidate 315 and the second PDCCH candidate 325 may be explicitly linked, and the UE 115-a may be aware of the linkage prior to decoding the received DCI. The search space set configuration restrictions may facilitate the linkage of the first PDCCH candidate 315 and the second PDCCH candidate 325 by providing a one-to-one mapping between monitoring occasions corresponding to the first PDCCH candidate 315 and the second PDCCH candidate 325.

The UE 115-a may monitor the first PDCCH candidate 315 in the first search space set 310, and the UE 115-a may monitor the second PDCCH candidate 325 in the second search space set 320. Because the UE 115-a has been configured with the association 305 (e.g., linkage) of the first PDCCH candidate 315 with the second PDCCH candidate 325, the UE may decode and combine the receptions of the same DCI of the first PDCCH candidate 315 and the second PDCCH candidate 325.

Figure 4:
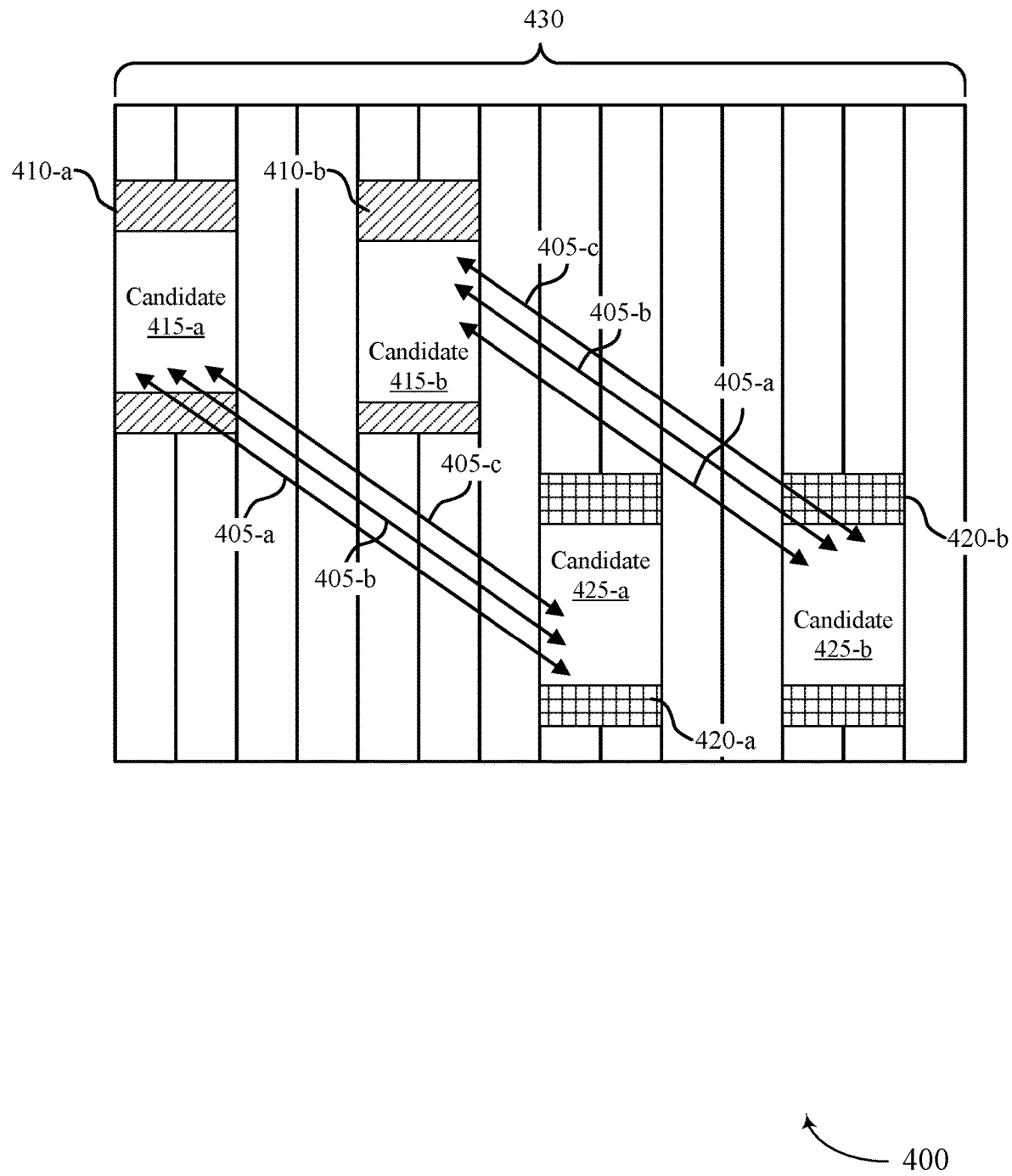
FIG. 4 shows an example of an association between downlink control information candidates that supports techniques for linking downlink control information candidates across multiple TRPs with cell DTX operations in accordance with one or more aspects of the present disclosure.

FIG. 4 shows an example of an association between downlink control information candidates 400 that supports techniques for linking downlink control information candidates across multiple TRPs with cell DTX operations in accordance with one or more aspects of the present disclosure. In some examples, the association between downlink control information candidates 400 may implement aspects of wireless communications systems 100 and 200. For example, the association between downlink control information candidates 400 may be configured by the network entity 105 or the network entity 105-a and may be signaled to the UE 115 or UE 115-a.

In some examples, the association between downlink control information candidates 400 may include a slot 430, multiple instances of a first search space set (e.g., first search space set 410-a and first search space set 410-b), multiple instances of a second search space set (e.g., second search space set 420-a and second search space set 420-b), multiple instance of a first PDCCH candidate (e.g., first PDCCH candidate 415-a and first PDCCH candidate 415-b), multiple instance of a second PDCCH candidate (e.g., second PDCCH candidate 425-a and second PDCCH candidate 425-b) and three levels of association or linkage (e.g., level 1 linkage 405-a, level 2 linkage 405-b and level 3 linkage 405-c).

In some examples, intra-slot PDCCH repetition may be specified, and inter-slot PDCCH repetition may not be not supported. In one example, the PDCCH candidates may have three levels of linkage. For level 1 linkage 405-a, two search space sets may be linked via RRC signaling from the network entity 105-a. For example, first search space set 410-a may be linked to the second search space set 420-a, and first search space set 410-b may be linked to the second search space set 420-b. Linked search space sets may have the same periodicity, slot offset, and duration. Linked search space sets may have the same search space set type and same DCI formats to monitor. Level 1 linkage 405-a may be supported for UE specific search space (USS) or Type 3 common search space (CSS). Other CSS sets (e.g., Type 0/0a/1/2 CSS) may not be linked, and recoverySearchSpaceId may not be linked.

For level 2 linkage 405-b, in the slot 430, an nth monitoring occasion of one service set is linked to the nth monitoring occasion of the other search space set, n representing a positive integer. For example, a first monitoring occasion of the first search space set 410-a may be linked to a first monitoring occasion of the second search space set 420-a, and a second monitoring occasion of the first search space set 410-b may be linked to a second monitoring occasion of the second search space set 420-b. In level 2 linkage, the linked search space sets may have the same quantity of monitoring occasions within the slot 430.

For level 3 linkage 405-c, the first PDCCH candidate (e.g., first PDCCH candidate 415-a and first PDCCH candidate 415-*b*) and the second PDCCH candidate (e.g., second PDCCH candidate 425-*a* and second PDCCH candidate 425-*b*) with the same aggregation level and the same candidate index may be linked. For example, the first PDCCH candidate 415-*a* may be linked to the second PDCCH candidate 425-*a*, and the first PDCCH candidate 415-*b* may be linked to the second PDCCH candidate 425-*b*. In level 3 linkage, the linked search space sets may be configured with the same quantity of candidates for each aggregation level.

In some examples, the first TRP 205-*a* and the second TRP 205-*b* may implement cell DTX and DRX operations to reduce energy consumption by the network entity 105-*a*. For the UE 115-*a* operating in mTRP mode and simultaneously communicating with both the first TRP 205-*a* and the second TRP 205-*b*, one advantage of mTRP operation may be an increased reliability of PDCCH reception by linking multiple PDCCH transmissions from the first TRP 205-*a* and the second TRP 205-*b*. The first TRP 205-*a* and the second TRP 205-*b* may transmit the same information thereby allowing the UE 115-*a* to combine the two receptions and achieve higher reception reliability. With cell DTX/DRX operation, if defined per TRP, linkage of PDCCH transmission across TRPs may be broken depending on the configuration of each TRP DTX/DRX cycle. Since it may be reasonable to have either the first TRP 205-*a* or the second TRP 205-*b* to be active at a given time to maintain high quality of service and allow the other TRP to be inactive for energy savings, the linkage across PDCCH occasions may be broken. For example, the PDCCH candidate may be within an inactive duration of the DTX cycle, and the TRP does not transmit the PDCCH repetition. Techniques for the UE 115-*a* to enhance the PDCCH linkage or drop PDCCH linkage in case of cell DTX being activated may be defined.

Figure 5:
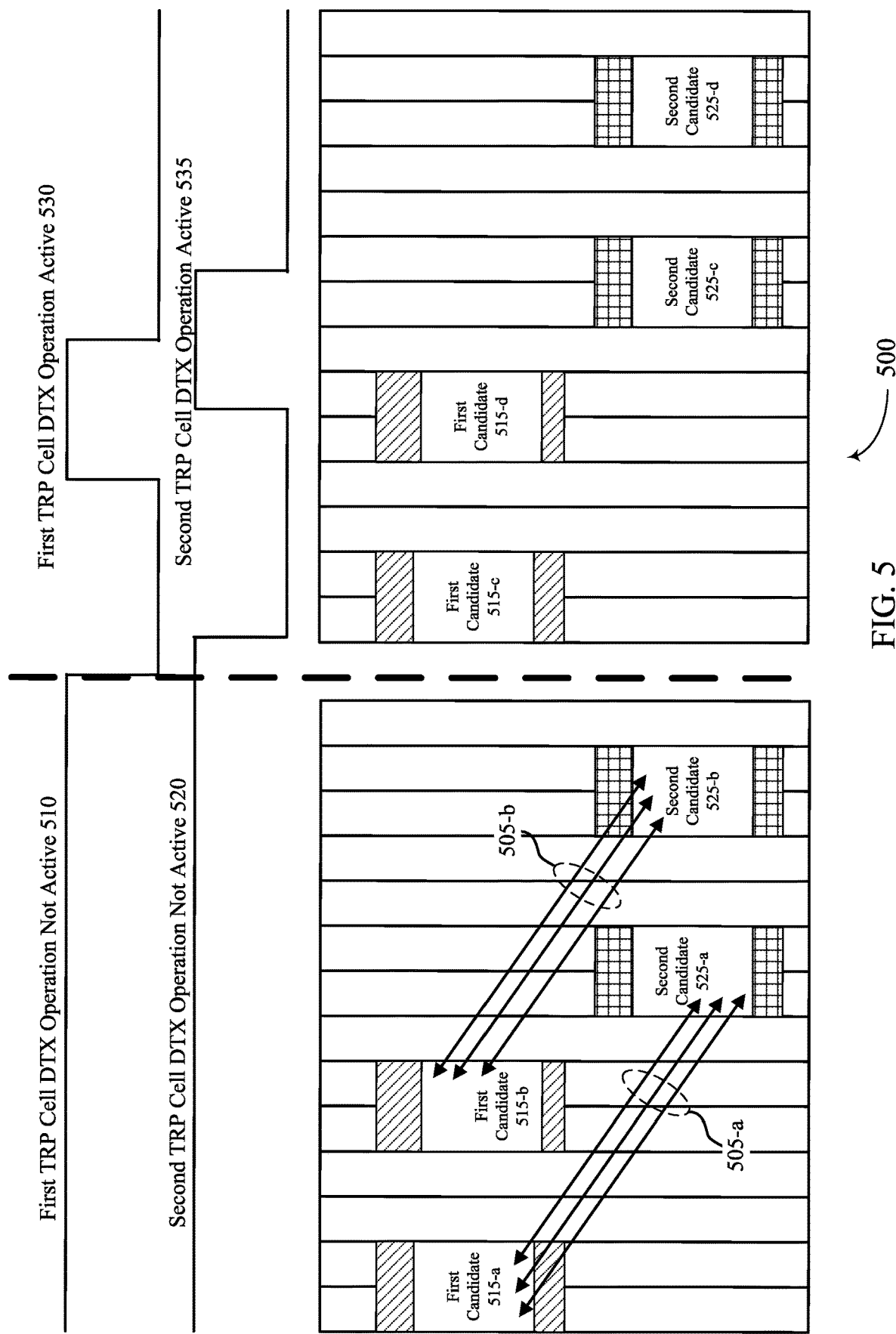
FIG. 5 shows an example of a cell DTX operation that supports techniques for linking downlink control information candidates across multiple TRPs with cell DTX operations in accordance with one or more aspects of the present disclosure.

FIG. 5 shows an example of a cell DTX operation 500 that supports techniques for linking downlink control information candidates across multiple TRPs with cell DTX operations in accordance with one or more aspects of the present disclosure. In some examples, the cell DTX operation 500 may implement aspects of wireless communications systems 100 and 200. For example, the cell DTX operation 500 may be configured by the network entity 105 or the network entity 105-*a*. In some examples, the UE 115-*a* may receive control signaling (e.g., control signaling 210-*a*) indicating a cell DTX operation status of first TRP 205-*a*, and the UE 115-*a* may receive control signaling (e.g., control signaling 210-*b*) indicating that cell DTX operation status of second TRP 205-*b*.

The cell DTX operation 500 may include a cell DTX operation for the first TRP 205-*a* and a cell DTX operation for the second TRP 205-*b*. In some examples, the first TRP 205-*a* may have a cell DTX operation status of a first TRP cell DTX operation not active 510 and a first TRP cell DTX operation active 530, and the second TRP 205-*b* may have a cell DTX operation status of a second TRP cell DTX operation not active 520 and a second TRP cell DTX operation active 535.

In some examples, when the first TRP 205-*a* has the cell DTX operation status of a first TRP cell DTX operation not active 510 and the second TRP 205-*b* may have a cell DTX operation status of a second TRP cell DTX operation not active 520, a linkage status of the associated first PDCCH candidate and second PDCCH candidate may be a maintained linkage. For example, as illustrated in FIG. 5, a first PDCCH candidate 515-*a* may maintain a linkage 505-*a* with a second PDCCH candidate 525-*a* and a first PDCCH candidate 515-*b* may maintain a linkage 505-*b* with a second PDCCH candidate 525-*b*.

In some examples, when cell DTX operation is activated in one of the TRPs, the UE 115-*a* may automatically assume dropping of the configured linkage across the monitoring occasions and may resume the linkage once the cell DTX operation is deactivated. Referring to FIG. 5, when the first TRP 205-*a* has the cell DTX operation status of the first TRP cell DTX operation active 530 or when the second TRP 205-*b* has the cell DTX operation status of the second TRP cell DTX operation active 535, the linkage status of the associated first PDCCH candidate and second PDCCH candidate may be a broken linkage. For example, as illustrated in FIG. 5, a first PDCCH candidate 515-*c* may have a broken linkage with a second PDCCH candidate 525-*c* and a first PDCCH candidate 515-*d* may have a broken linkage with a second PDCCH candidate 525-*d*.

In some examples, when the cell DTX operation status is active for at least one of the TRPs and the linkage status is the broken linkage, the UE 115-*a* may not monitor the monitoring occasions depending on the TCI state of the associated CORESETS depending on which TRP or TCI state is inactive. In some examples, the UE 115-*a* may receive control signaling (e.g., control signaling 210-*a*) indicating a DTX cycle including an active duration and an inactive duration of the first TRP 205-*a*. If the first PDCCH candidate is within the inactive duration, the UE 115-*a* may monitor the second PDCCH candidate and may drop monitoring the first PDCCH candidate, and the first PDCCH candidate may not be linked with the second PDCCH candidate based on the broken linkage.

In another example, when the cell DTX operation status is active for at least one of the TRPs and the linkage status is the broken linkage, the UE 115-*a* may individually monitor the monitoring occasions and search space sets if applicable given a quantity of blind decoding attempts. When the linkage status is broken linkage, the UE 115-*a* may assume transmission of PDCCH from one TRP and the quantity of blind decodings are implied by the UE 115-*a*. For example, the UE 115-*a* may monitor the first PDCCH candidate and the second PDCCH candidate, and the first PDCCH candidate may not be linked with the second PDCCH candidate based on the broken linkage.

Figure 6:
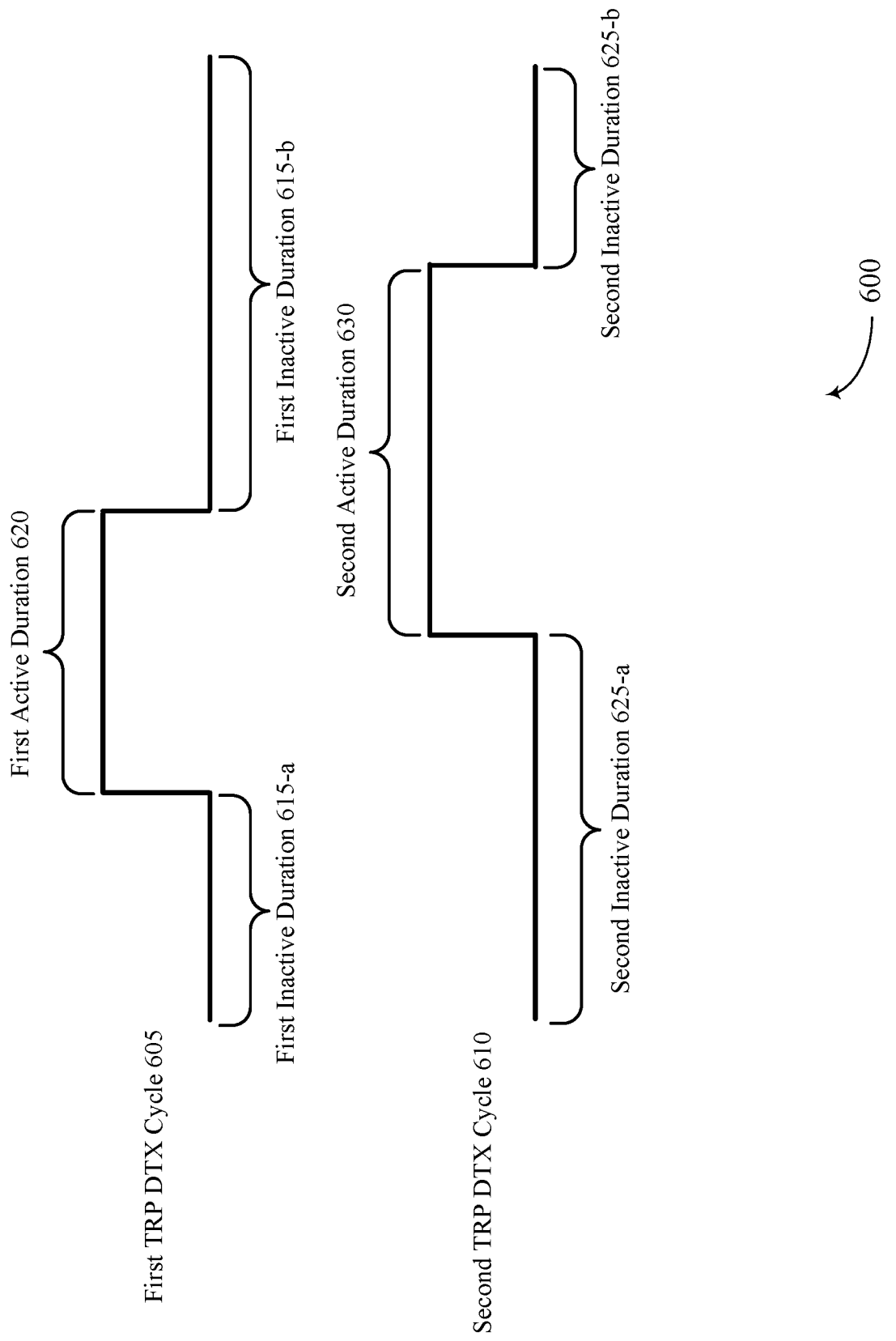
FIG. 6 shows an example of a cell DTX cycle that supports techniques for linking downlink control information candidates across multiple TRPs with cell DTX operations in accordance with one or more aspects of the present disclosure.

FIG. 6 shows an example of a cell DTX cycle 600 that supports techniques for linking downlink control information candidates across multiple TRPs with cell DTX operations in accordance with one or more aspects of the present disclosure. In some examples, the cell DTX cycle 600 may implement aspects of wireless communications systems 100 and 200. For example, the cell DTX cycle 600 may be configured by the network entity 105 or the network entity 105-*a*. In some examples, the UE 115-*a* may receive control signaling (e.g., control signaling 210-*a*) indicating a cell DTX cycle including one or more active durations and one or more inactive durations of first TRP 205-*a*, and the UE 115-*a* may receive control signaling (e.g., control signaling 210-*b*) indicating a cell DTX cycle including one or more active durations and one or more inactive durations of second TRP 205-*b*.

The cell DTX cycle 600 may include a first TRP DTX cycle 605 of the first TRP 205-*a* and a second TRP DTX cycle 610 of the second TRP 205-*b*. In some examples, the first TRP DTX cycle 605 may have a first inactive duration 615-*a*, a first active duration 620, and a first inactive duration 615-*b*. The second TRP DTX cycle 610 may have a second inactive duration 625-*a*, a second active duration 630, and a second inactive duration 625-*b*. When the cell DTX is activated, linkage of each PDCCH candidate may depend on which TRP is active.

In some examples, if the linked PDCCH candidates fall within the active duration of its corresponding TRP, the linkage may be maintained without any change. For example, the UE 115-a may receive control signaling (e.g., control signaling 210-a) indicating the first DTX operation status of the first TRP 205-a is an active DTX status and indicating a first TRP DTX cycle 605 including the first inactive duration 615-a and the first active duration 620. The UE 115-a may receive control signaling (e.g., control signaling 210-b) indicating the second DTX operation status of the second TRP 205-b is an active DTX status and indicating the second TRP DTX cycle 610 including the second inactive duration 625-a and the second active duration 630. When the first PDCCH candidate is within the first active duration 620 and the second PDCCH candidate is within the second active duration 630, the linkage status may be a maintained linkage. The UE 115-a may monitor the first PDCCH candidate and the second PDCCH candidate, and the first PDCCH candidate may be linked with the second PDCCH candidate based on the maintained linkage.

In some examples, if one of the PDCCH candidates fall within an inactive duration of one of the TRPs while the other linked PDCCH candidate falls within an active duration of the other TRP, the UE 115-a may assume the transmission of both of the PDCCH candidates. That is, if one PDCCH candidate is falling within the active duration of its corresponding TRP, the other PDCCH candidates are also transmitted even if during an inactive duration; for example, the inactive TRP becomes active to transmit the downlink control information and then become inactive. For example, the UE 115-a may receive control signaling (e.g., control signaling 210-a) indicating the first DTX operation status of the first TRP 205-a is an active DTX status and indicating a first TRP DTX cycle 605 including the first inactive duration 615-a and the first active duration 620. The UE 115-a may receive control signaling (e.g., control signaling 210-b) indicating the second DTX operation status of the second TRP 205-b is an active DTX status and indicating the second TRP DTX cycle 610 including the second inactive duration 625-a and the second active duration 630. When the first PDCCH candidate is within the first active duration 620 and the second PDCCH candidate is within the second inactive duration 625-a, the linkage status may be a maintained linkage. The UE 115-a may monitor the first PDCCH candidate and the second PDCCH candidate, and the first PDCCH candidate may be linked with the second PDCCH candidate based on the maintained linkage.

In some examples, if one of the PDCCH candidates fall within an active duration of one of the TRPs while the other linked PDCCH candidate falls within an inactive duration of the other TRP, the UE 115-a may assume the transmission of PDCCH candidate falling outside of the active duration will not be transmitted. For example, the UE 115-a may receive control signaling (e.g., control signaling 210-a) indicating the first DTX operation status of the first TRP 205-a is an active DTX status and indicating a first TRP DTX cycle 605 including the first inactive duration 615-a and the first active duration 620. The UE 115-a may receive control signaling (e.g., control signaling 210-b) indicating the second DTX operation status of the second TRP 205-b is an active DTX status and indicating the second TRP DTX cycle 610 including the second inactive duration 625-a and the second active duration 630. When the first PDCCH candidate is within the first active duration 620 and the second PDCCH candidate is within the second inactive duration 625-a, the linkage status may be a broken linkage. The UE 115-a may monitor the first PDCCH candidate, and the UE 115-a may drop the second PDCCH candidate. The first PDCCH candidate may not be linked with the second PDCCH candidate based on the broken linkage.

In some examples, the linkage status may be a function of the DCI format. For example, the UE 115-a may be RRC configured with DCI formats for which the linkage may be maintained or broken regardless of the cell DTX cycles. In another example, the UE 115-a may be RRC configured with DCI formats for which the linkage may be broken conditionally based on the cell DTX cycles.

In some examples, the UE 115-a may receive control signaling (e.g., control signaling 210-a or control signaling 210-b) indicating a DCI format. The UE 115-a may receive control signaling (e.g., control signaling 210-a) indicating a DTX status of the first TRP 205-a is an active DTX status, and the linkage status of the first PDCCH candidate and the second candidate may be a broken linkage based on the DCI format.

In some examples, the UE 115-a may receive control signaling (e.g., control signaling 210-a or control signaling 210-b) indicating a DCI format. The UE 115-a may receive control signaling (e.g., control signaling 210-a) indicating a DTX status of the first TRP 205-a is an active DTX status, and the linkage status of the first PDCCH candidate and the second candidate may be a maintained linkage based on the DCI format.

In some examples, the UE 115-a may receive control signaling (e.g., control signaling 210-a or control signaling 210-b) indicating a DCI format. The UE 115-a may receive control signaling (e.g., control signaling 210-a) indicating the first DTX operation status of the first TRP 205-a is an active DTX status and indicating a first TRP DTX cycle 605 including the first inactive duration 615-a and the first active duration 620. The UE 115-a may receive control signaling (e.g., control signaling 210-b) indicating the second DTX operation status of the second TRP 205-b is an active DTX status and indicating the second TRP DTX cycle 610 including the second inactive duration 625-a and the second active duration 630. When the first PDCCH candidate is within the first active duration 620 and the second PDCCH candidate is within the second inactive duration 625-a, the linkage status may be a maintained linkage based on the DCI format.

In some examples, the UE 115-a may receive control signaling (e.g., control signaling 210-a or control signaling 210-b) indicating a DCI format. The UE 115-a may receive control signaling (e.g., control signaling 210-a) indicating the first DTX operation status of the first TRP 205-a is an active DTX status and indicating a first TRP DTX cycle 605 including the first inactive duration 615-a and the first active duration 620. The UE 115-a may receive control signaling (e.g., control signaling 210-b) indicating the second DTX operation status of the second TRP 205-b is an active DTX status and indicating the second TRP DTX cycle 610 including the second inactive duration 625-a and the second active duration 630. When the first PDCCH candidate is within the first active duration 620 and the second PDCCH candidate is within the second inactive duration 625-a, the linkage status may be a broken linkage based on the DCI format.

In some examples, the UE 115-a may monitor the first PDCCH candidate and the second PDCCH candidate based on the DCI format. In some examples, the UE 115-a may monitor the first PDCCH candidate and drop the second PDCCH candidate based on the DCI format.

Figure 7:
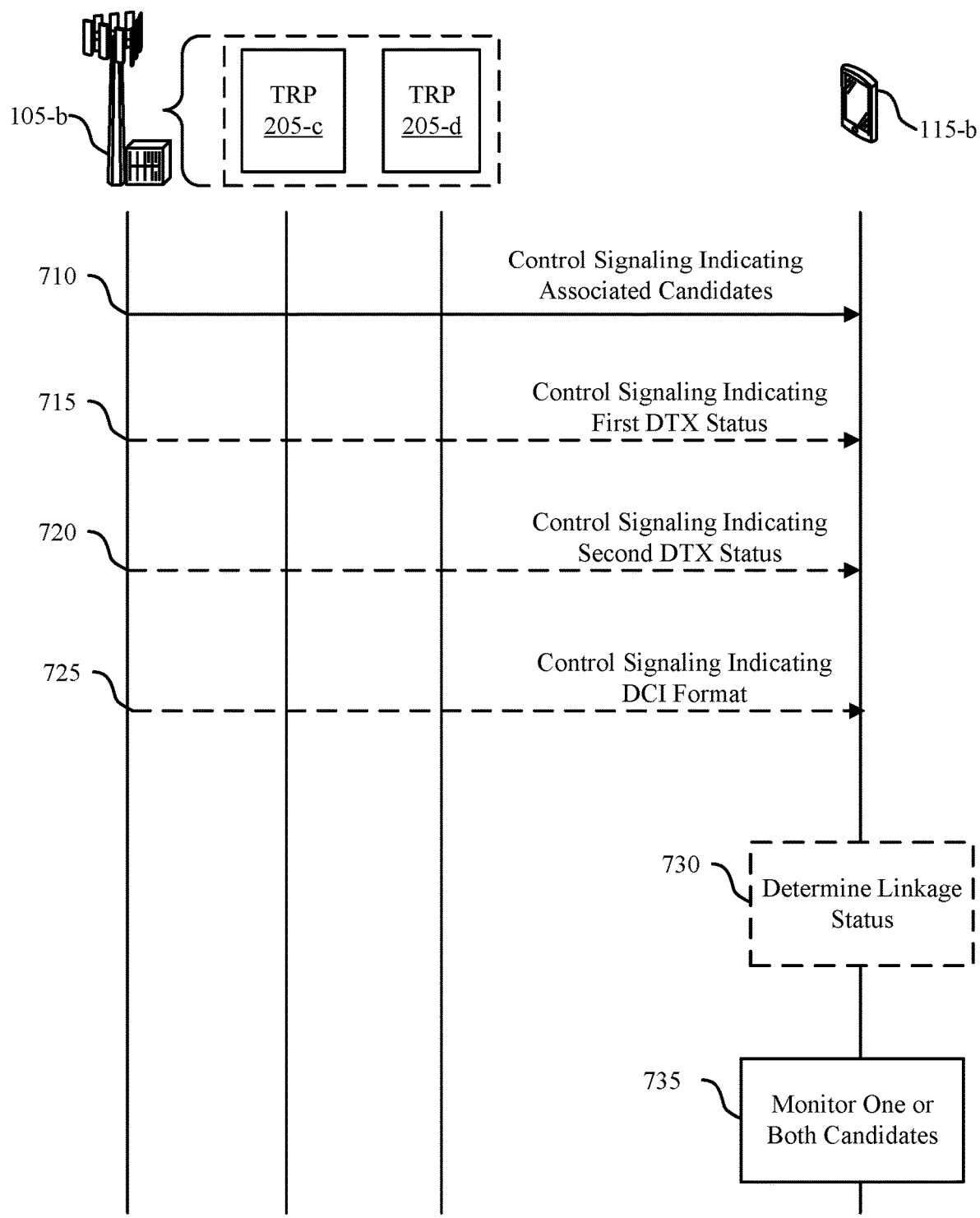
FIG. 7 shows an example of a process flow that supports techniques for linking downlink control information candidates across multiple TRPs with cell DTX operations in accordance with one or more aspects of the present disclosure.

FIG. 7 shows an example of a process flow 700 that supports techniques for linking downlink control information candidates across multiple TRPs with cell DTX operations in accordance with one or more aspects of the present disclosure. Aspects of the process flow 700 may implement, or be implemented by, aspects of wireless communications system 100 and the wireless communications system 200, or any combination thereof. For example, the process flow 700 illustrates signaling and configurations that enable linking downlink control information candidates across multiple TRPs with cell DTX operations, as described previously herein.

The process flow 700 includes a network entity 105-*b*, a first TRP 205-*c*, a second TRP 205-*d* and a UE 115-*b*, which may be examples of the UEs 115, the UE 115-*a*, the network entities 105, the network entity 105-*a*, the first TRP 205-*a*, the second TRP 205-*b*, and other wireless devices as described herein. For example, the first TRP 205-*c* and the second TRP 205-*d* illustrated in FIG. 7 may include examples of the first TRP 205-*a* and the second TRP 205-*b*, as illustrated in FIG. 2. Similarly, the UE 115-*b* illustrated in FIG. 7 may include an example of the UE 115-*a* as illustrated in FIG. 2, and the network entity 105-*b* illustrated in FIG. 7 may include an example of the network entity 105-*a* as illustrated in FIG. 2.

In some examples, the operations illustrated in process flow 700 may be performed by hardware (e.g., including circuitry, processing blocks, logic components, and other components), code (e.g., software executed by a processor), or any combination thereof. Alternative examples of the following may be implemented, where some steps are performed in a different order than described or are not performed at all. In some cases, steps may include additional features not mentioned below, or further steps may be added.

At 710, the UE 115-*b* may receive control signaling indicating a first downlink control information candidate (e.g., first PDCCH candidate) from a first TRP 205-*c* is associated with a second downlink control information candidate (e.g., second PDCCH candidate) from a second TRP 205-*d*.

At 715, optionally, the UE 115-*b* may receive control signaling indicating a first DTX status of the first TRP 205-*c*. In some examples, the UE 115-*b* may receive control signaling indicating the first DTX status is an active DTX status. In some examples, the UE 115-*b* may receive control signaling indicating the first DTX status is an active DTX status and a first DTX cycle including a first active duration and a first inactive duration of the first TRP 205-*c*.

At 720, optionally, the UE 115-*b* may receive control signaling indicating a second DTX status of the second TRP 205-*d*. In some examples, the UE 115-*b* may receive control signaling indicating the second DTX status is an active DTX status. In some examples, the UE 115-*b* may receive control signaling indicating the second DTX status is an active DTX status and a second DTX cycle including a second active duration and a second inactive duration of the second TRP 205-*d*.

At 725, optionally, the UE 115-*b* may receive control signaling indicating a downlink control information format.

At 730, optionally, the UE 115-*b* may determine a linkage status of the first downlink control information candidate (e.g., first PDCCH candidate) and second downlink control information candidate (e.g., second PDCCH candidate) based on the first DTX status of the first TRP 205-*c*, the second DTX status of the second TRP 205-*d*, the downlink control information format or a combination thereof.

In some examples, the UE 115-*b* may determine the linkage status is a broken linkage based on the active DTX status. In some examples, the UE 115-*b* may determine the linkage status is a maintained linkage based on the first downlink control information candidate (e.g., first PDCCH candidate) is within the first active duration and the second downlink control information candidate (e.g., second PDCCH candidate) is within the second active duration. In some examples, the UE 115-*b* may determine the linkage status is a maintained linkage based on the first downlink control information candidate (e.g., first PDCCH candidate) is within the first active duration and the second downlink control information candidate (e.g., second PDCCH candidate) is within the second inactive duration. In some examples, the UE 115-*b* may determine the linkage status is a broken linkage based on the first downlink control information candidate (e.g., first PDCCH candidate) is within the first active duration and the second downlink control information candidate (e.g., second PDCCH candidate) is within the second inactive duration.

In some examples, the UE 115-*b* may determine the linkage status based on the downlink control information format. In some examples, the UE 115-*b* may determine the linkage status is a broken linkage when the first TRP 205-*a* or the second TRP 205-*d* has the active DTX status based on the downlink control information format. In some examples, the UE 115-*b* may determine the linkage status is a maintained linkage when the first TRP 205-*a* or the second TRP has the active DTX status based on the downlink control information format. In some examples, the UE 115-*b* may determine the linkage status is a maintained linkage when the first downlink control information candidate (e.g., first PDCCH candidate) is within the first active duration and the second downlink control information candidate (e.g., second PDCCH candidate) is within the second inactive duration based on the downlink control information format. In some examples, the UE 115-*b* may determine the linkage status is a broken linkage when the first downlink control information candidate (e.g., first PDCCH candidate) is within the first active duration and the second downlink control information candidate (e.g., second PDCCH candidate) is within the second inactive duration based on the downlink control information format.

At 735, the UE 115-*b* monitors one or both of the first downlink control information candidate (e.g., first PDCCH candidate) and the second downlink control information candidate (e.g., second PDCCH candidate) according to the linkage status. In some examples, the UE 115-*b* may monitor the second downlink control information candidate (e.g., second PDCCH candidate) when the first TRP 205-*c* has an active DTX status, and the first downlink control information candidate (e.g., first PDCCH candidate) is not linked with the second downlink control information candidate (e.g., second PDCCH candidate) based on the broken linkage. In some examples, the UE 115-*b* may monitor the first downlink control information candidate (e.g., first PDCCH candidate) and the second downlink control information candidate (e.g., second PDCCH candidate) when the first TRP 205-*c* has an active DTX status, and the first downlink control information candidate (e.g., first PDCCH candidate) is not linked with the second downlink control information candidate (e.g., second PDCCH candidate) based on the broken linkage.

In some examples, the UE 115-*b* may monitor the first downlink control information candidate (e.g., first PDCCH candidate) and the second downlink control information candidate (e.g., second PDCCH candidate) when the first downlink control information candidate (e.g., first PDCCH candidate) is within the first active duration and the second downlink control information candidate (e.g., second PDCCH candidate) is within the second active duration, and the first downlink control information candidate (e.g., first PDCCH candidate) is linked with the second downlink control information candidate (e.g., second PDCCH candidate) based on the maintained linkage.

In some examples, the UE 115-b may monitor the first downlink control information candidate (e.g., first PDCCH candidate) and the second downlink control information candidate (e.g., second PDCCH candidate) when the first downlink control information candidate (e.g., first PDCCH candidate) is within the first active duration and the second downlink control information candidate (e.g., second PDCCH candidate) is within the second inactive duration, and the first downlink control information candidate (e.g., first PDCCH candidate) is linked with the second downlink control information candidate (e.g., second PDCCH candidate) based on the maintained linkage.

In some examples, the UE 115-b may monitor the first downlink control information candidate (e.g., first PDCCH candidate) and may drop the second downlink control information candidate (e.g., second PDCCH candidate) when the first downlink control information candidate (e.g., first PDCCH candidate) is within the first active duration and the second downlink control information candidate (e.g., second PDCCH candidate) is within the second inactive duration, and the first downlink control information candidate (e.g., first PDCCH candidate) is not linked with the second downlink control information candidate (e.g., second PDCCH candidate) based on the broken linkage.

Figure 8:
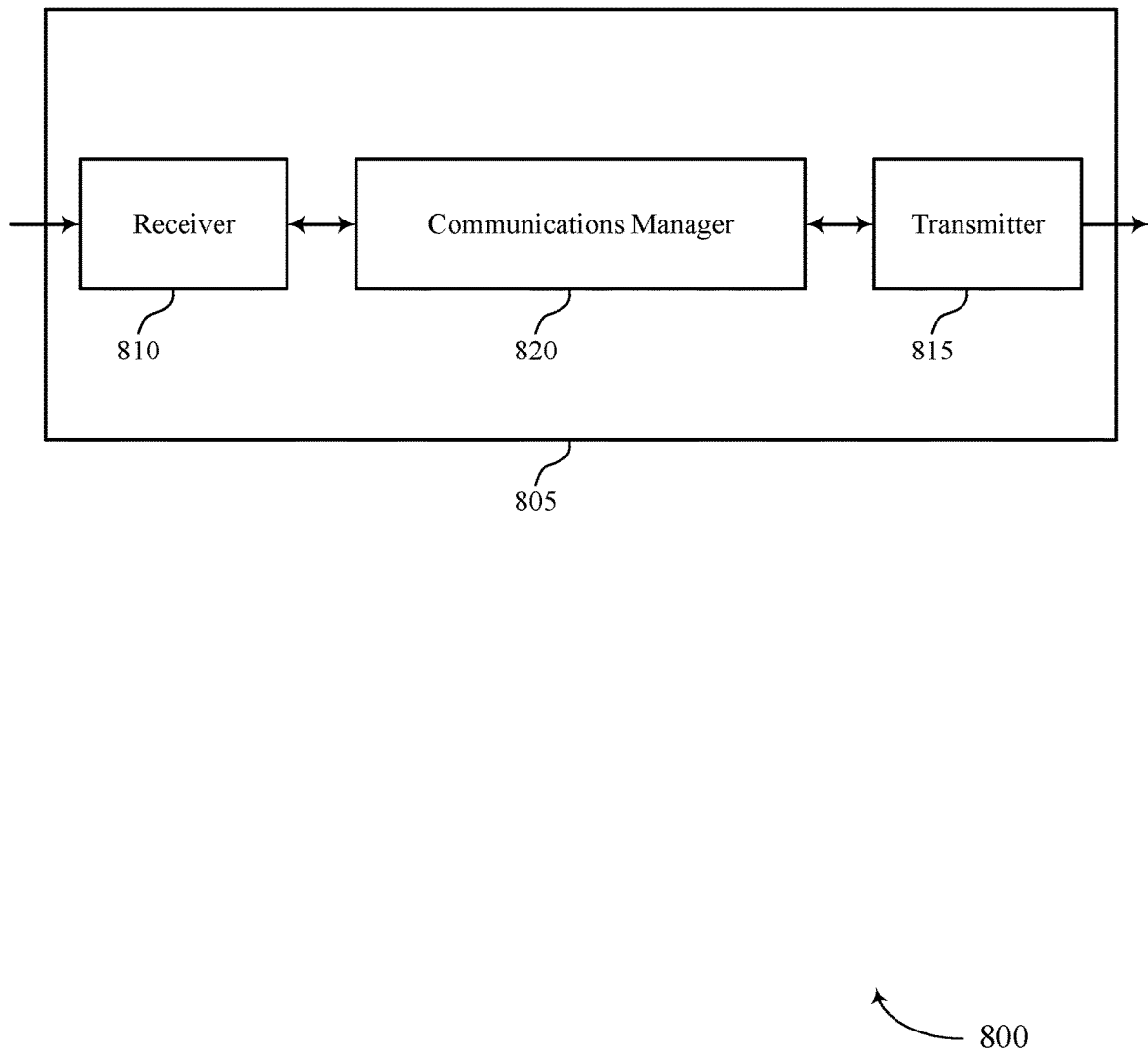
FIGS. 8 and 9 show block diagrams of devices that support techniques for linking downlink control information candidates across multiple TRPs with cell DTX operations in accordance with one or more aspects of the present disclosure.

FIG. 8 shows a block diagram 800 of a device 805 that supports techniques for linking downlink control information candidates across multiple TRPs with cell DTX operations in accordance with one or more aspects of the present disclosure. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for linking downlink control information candidates across multiple TRPs with cell DTX operations). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for linking downlink control information candidates across multiple TRPs with cell DTX operations). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for linking downlink control information candidates across multiple TRPs with cell DTX operations as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 is capable of, configured to, or operable to support a means for receiving first control signaling indicating a first downlink control information candidate from a first TRP is associated with a second downlink control information candidate from a second TRP. The communications manager 820 is capable of, configured to, or operable to support a means for monitoring one or both of the first downlink control information candidate and the second downlink control information candidate according to a linkage status of the first downlink control information candidate and the second downlink control information candidate, where the linkage status is based on a first DTX status of the first TRP, a second DTX status of the second TRP, a downlink control information format, or a combination thereof.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reduced processing and more efficient utilization of communication resources.

Figure 9:
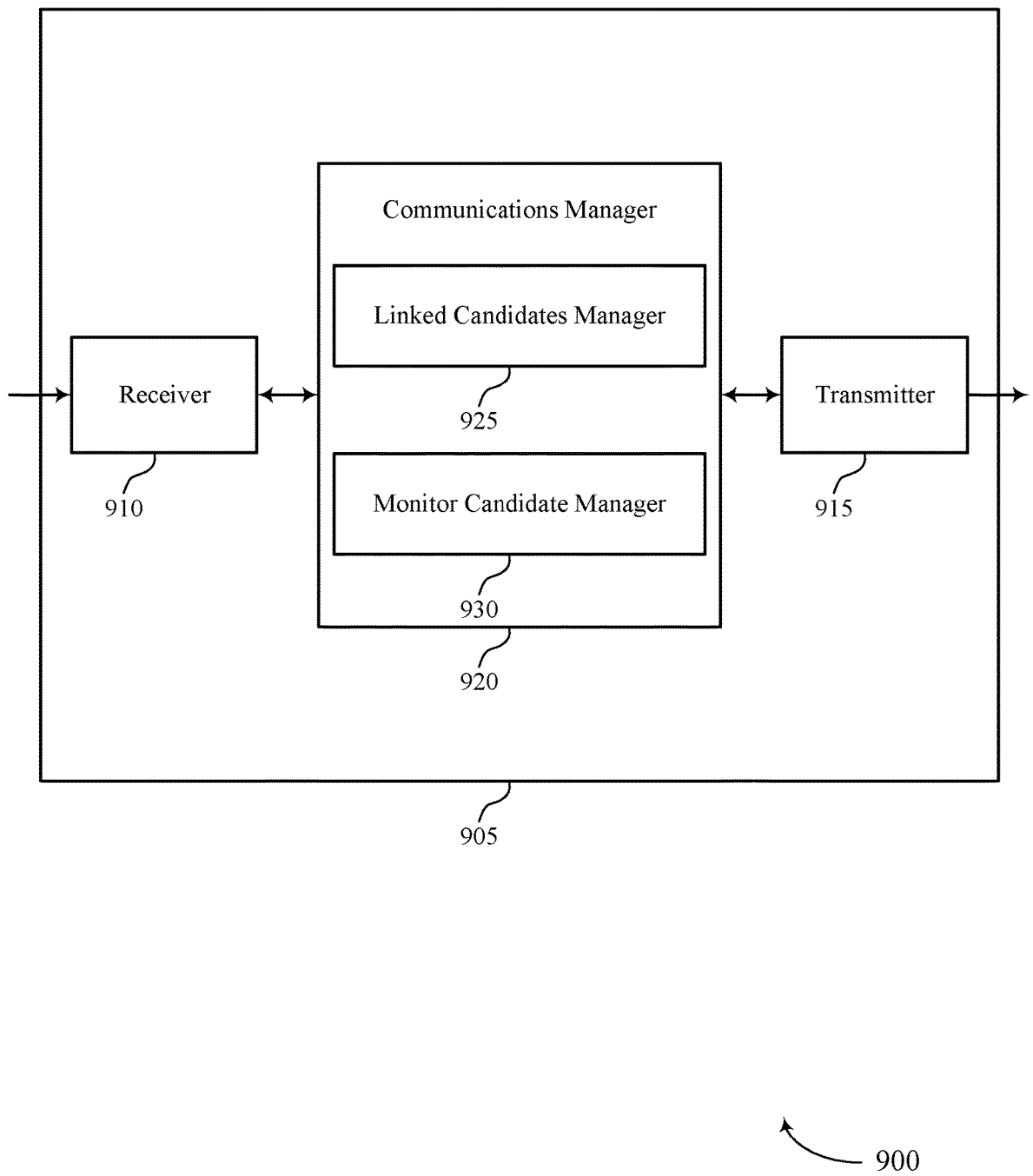

FIG. 9 shows a block diagram 900 of a device 905 that supports techniques for linking downlink control information candidates across multiple TRPs with cell DTX operations in accordance with one or more aspects of the present disclosure. The device 905 may be an example of aspects of a device 805 or a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for linking downlink control information candidates across multiple TRPs with cell DTX operations). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for linking downlink control information candidates across multiple TRPs with cell DTX operations). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for linking downlink control information candidates across multiple TRPs with cell DTX operations as described herein. For example, the communications manager 920 may include a linked candidates manager 925 a monitor candidate manager 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The linked candidates manager 925 is capable of, configured to, or operable to support a means for receiving first control signaling indicating a first downlink control information candidate from a first TRP is associated with a second downlink control information candidate from a second TRP. The monitor candidate manager 930 is capable of, configured to, or operable to support a means for monitoring one or both of the first downlink control information candidate and the second downlink control information candidate according to a linkage status of the first downlink control information candidate and the second downlink control information candidate, where the linkage status is based on a first DTX status of the first TRP, a second DTX status of the second TRP, a downlink control information format, or a combination thereof.

Figure 10:
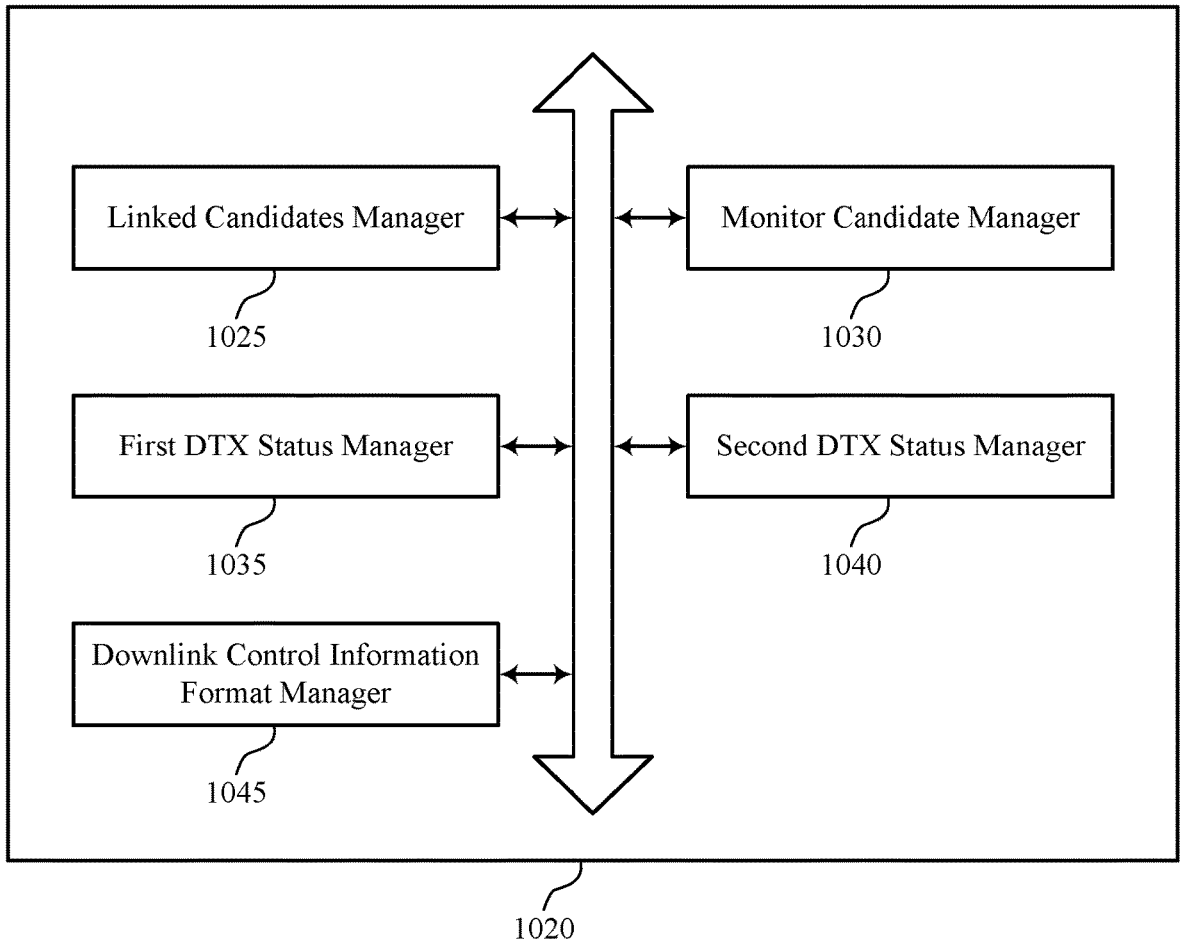
FIG. 10 shows a block diagram of a communications manager that supports techniques for linking downlink control information candidates across multiple TRPs with cell DTX operations in accordance with one or more aspects of the present disclosure.

FIG. 10 shows a block diagram 1000 of a communications manager 1020 that supports techniques for linking downlink control information candidates across multiple TRPs with cell DTX operations in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for linking downlink control information candidates across multiple TRPs with cell DTX operations as described herein. For example, the communications manager 1020 may include a linked candidates manager 1025, a monitor candidate manager 1030, a first DTX status manager 1035, a second DTX status manager 1040, a downlink control information format manager 1045, or any combination thereof. Each of these components, or components or subcomponents thereof (e.g., one or more processors, one or more memories), may communicate, directly or indirectly, with one another (e.g., via one or more buses).

The communications manager 1020 may support wireless communications at a UE in accordance with examples as disclosed herein. The linked candidates manager 1025 is capable of, configured to, or operable to support a means for receiving first control signaling indicating a first downlink control information candidate from a first TRP is associated with a second downlink control information candidate from a second TRP. The monitor candidate manager 1030 is capable of, configured to, or operable to support a means for monitoring one or both of the first downlink control information candidate and the second downlink control information candidate according to a linkage status of the first downlink control information candidate and the second downlink control information candidate, where the linkage status is based on a first DTX status of the first TRP, a second DTX status of the second TRP, a downlink control information format, or a combination thereof.

In some examples, the first DTX status manager 1035 is capable of, configured to, or operable to support a means for receiving second control signaling indicating the first DTX status is an active DTX status, the linkage status of the first downlink control information candidate and the second downlink control information candidate being a broken linkage based on the active DTX status.

In some examples, the first DTX status manager 1035 is capable of, configured to, or operable to support a means for receiving third control signaling indicating a first DTX cycle including an active duration and an inactive duration of the first TRP such that the first downlink control information candidate is within the inactive duration. In some examples, monitoring one or both of the first downlink control information candidate and the second downlink control information candidate includes monitoring the second downlink control information candidate, where the first downlink control information candidate is not linked with the second downlink control information candidate based on the broken linkage.

In some examples, to support monitoring one or both of the first downlink control information candidate and the second downlink control information candidate, the monitor candidate manager 1030 is capable of, configured to, or operable to support a means for monitoring the first downlink control information candidate and the second downlink control information candidate, where the first downlink control information candidate is not linked with the second downlink control information candidate based on the broken linkage.

In some examples, the first DTX status manager 1035 is capable of, configured to, or operable to support a means for receiving second control signaling indicating the first DTX status is an active DTX status and indicating a first DTX cycle including a first active duration and a first inactive duration of the first TRP. In some examples, the second DTX status manager 1040 is capable of, configured to, or operable to support a means for receiving third control signaling indicating the second DTX status is an active DTX status and indicating a second DTX cycle including a second active duration and a second inactive duration of the second TRP; the linkage status of the first downlink control information candidate and the second downlink control information candidate being a maintained linkage based on the first downlink control information candidate being within the first active duration and the second downlink control information candidate being within the second active duration.

In some examples, to support monitoring one or both of the first downlink control information candidate and the second downlink control information candidate, the monitor candidate manager 1030 is capable of, configured to, or operable to support a means for monitoring the first downlink control information candidate and the second downlink control information candidate, where the first downlink control information candidate is linked with the second downlink control information candidate based on the maintained linkage.

In some examples, the first DTX status manager 1035 is capable of, configured to, or operable to support a means for receiving second control signaling indicating the first DTX status is an active DTX status and indicating a first DTX cycle including a first active duration and a first inactive duration of the first TRP. In some examples, the second DTX status manager 1040 is capable of, configured to, or operable to support a means for receiving third control signaling indicating the second DTX status is an active DTX status and indicating a second DTX cycle including a second active duration and a second inactive duration of the second TRP; the linkage status of the first downlink control information candidate and the second downlink control information candidate being a maintained linkage based on the first downlink control information candidate being within the first active duration and the second downlink control information candidate being within the second inactive duration.

In some examples, to support monitoring one or both of the first downlink control information candidate and the second downlink control information candidate, the monitor candidate manager 1030 is capable of, configured to, or operable to support a means for monitoring the first downlink control information candidate and the second downlink control information candidate, where the first downlink control information candidate is linked with the second downlink control information candidate based on the maintained linkage.

In some examples, receiving second control signaling indicating the first DTX status is an active DTX status and indicating a first DTX cycle including a first active duration and a first inactive duration of the first TRP. In some examples, receiving third control signaling indicating the second DTX status is an active DTX status and indicating a second DTX cycle including a second active duration and a second inactive duration of the second TRP; the linkage status of the first downlink control information candidate and the second downlink control information candidate being a broken linkage based on the first downlink control information candidate being within the first active duration and the second downlink control information candidate being within the second inactive duration.

In some examples, to support monitoring one or both of the first downlink control information candidate and the second downlink control information candidate, the monitor candidate manager 1030 is capable of, configured to, or operable to support a means for monitoring the first downlink control information candidate. In some examples, to support monitoring one or both of the first downlink control information candidate and the second downlink control information candidate, the monitor candidate manager 1030 is capable of, configured to, or operable to support a means for dropping the second downlink control information candidate, where the first downlink control information candidate is not linked with the second downlink control information candidate based on the broken linkage.

In some examples, the downlink control information format manager 1045 is capable of, configured to, or operable to support a means for receiving second control signaling indicating the downlink control information format. In some examples, the first DTX status manager 1035 is capable of, configured to, or operable to support a means for receiving third control signaling indicating the DTX status of the first TRP is an active DTX status; the linkage status of the first downlink control information candidate and the second downlink control information candidate being a maintained linkage based on the downlink control information format.

In some examples, the downlink control information format manager 1045 is capable of, configured to, or operable to support a means for receiving second control signaling indicating the downlink control information format. In some examples, the first DTX status manager 1035 is capable of, configured to, or operable to support a means for receiving third control signaling indicating the DTX status of the first TRP is an active DTX status; the linkage status of the first downlink control information candidate and the second downlink control information candidate being a broken linkage based on the downlink control information format.

In some examples, the downlink control information format manager 1045 is capable of, configured to, or operable to support a means for receiving second control signaling indicating the downlink control information format. In some examples, the first DTX status manager 1035 is capable of, configured to, or operable to support a means for receiving third control signaling indicating the first DTX status is an active DTX status and indicating a first DTX cycle including a first active duration and a first inactive duration of the first TRP. In some examples, the second DTX status manager 1040 is capable of, configured to, or operable to support a means for receiving fourth control signaling indicating the second DTX status is an active DTX status and indicating a second DTX cycle including a second active duration and a second inactive duration of the second TRP; the linkage status of the first downlink control information candidate and the second downlink control information candidate being a maintained linkage based on the downlink control information format and on the first downlink control information candidate being within the first active duration and the second downlink control information candidate being within the second inactive duration.

In some examples, the downlink control information format manager 1045 is capable of, configured to, or operable to support a means for receiving second control signaling indicating the downlink control information format. In some examples, the first DTX status manager 1035 is capable of, configured to, or operable to support a means for receiving third control signaling indicating the first DTX status is an active DTX status and indicating a first DTX cycle including a first active duration and a first inactive duration of the first TRP. In some examples, the second DTX status manager 1040 is capable of, configured to, or operable to support a means for receiving fourth control signaling indicating the second DTX status is an active DTX status and indicating a second DTX cycle including a second active duration and a second inactive duration of the second TRP; the linkage status of the first downlink control information candidate and the second downlink control information candidate being a broken linkage based on the downlink control information format and based on the first downlink control information candidate being within the first active duration and the second downlink control information candidate being within the second inactive duration.

Figure 11:
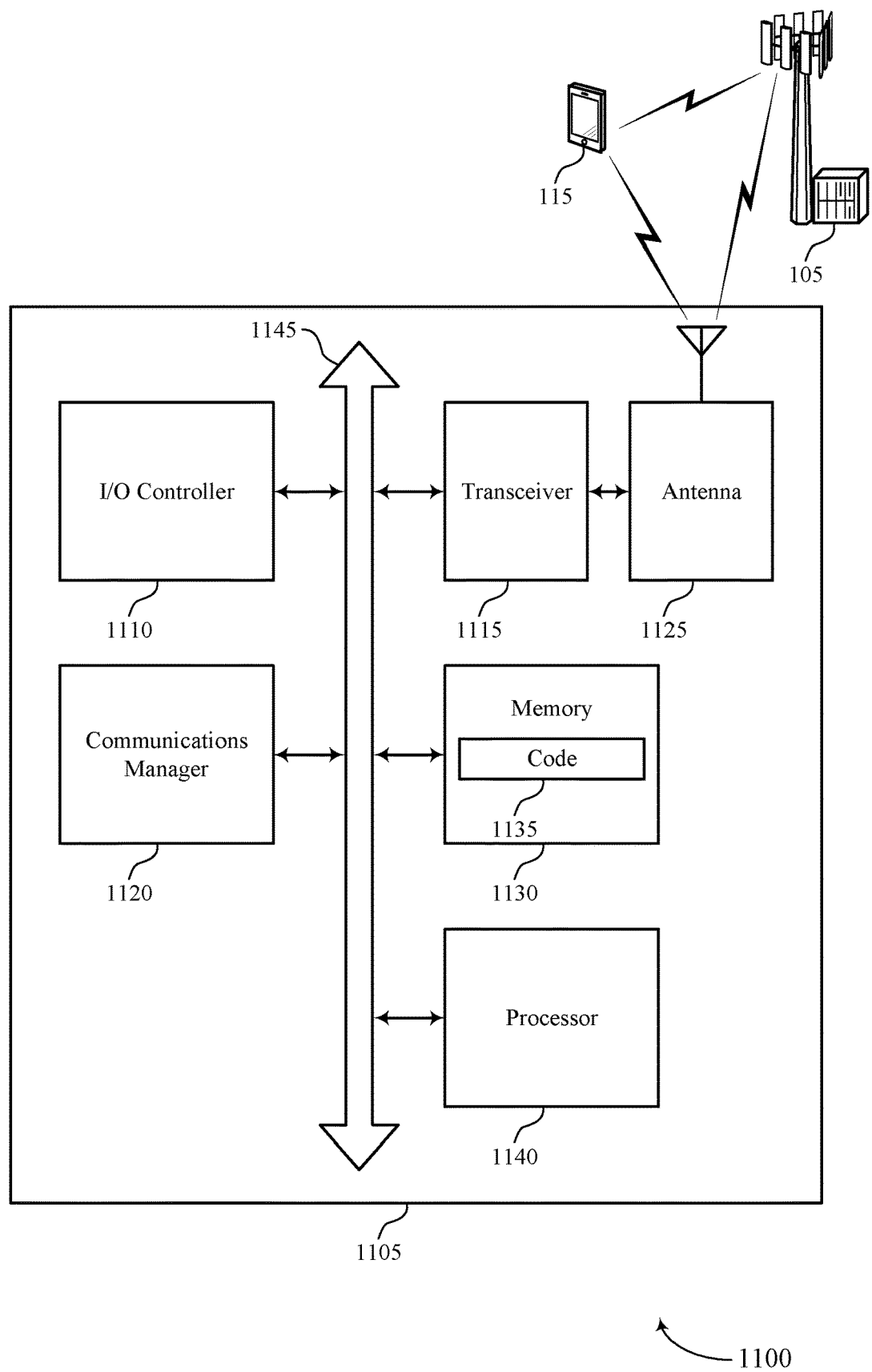
FIG. 11 shows a diagram of a system including a device that supports techniques for linking downlink control information candidates across multiple TRPs with cell DTX operations in accordance with one or more aspects of the present disclosure.

FIG. 11 shows a diagram of a system 1100 including a device 1105 that supports techniques for linking downlink control information candidates across multiple TRPs with cell DTX operations in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable code 1135 including instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may contain, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting techniques for linking downlink control information candidates across multiple TRPs with cell DTX operations). For example, the device 1105 or a component of the device 1105 may include at least one processor 1140 and at least one memory 1130 coupled with or to the at least one processor 1140, the at least one processor 1140 and at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions herein.

The communications manager 1120 may support wireless communications at a UE in accordance with examples as disclosed herein. For example, the communications manager 1120 is capable of, configured to, or operable to support a means for receiving first control signaling indicating a first downlink control information candidate from a first TRP is associated with a second downlink control information candidate from a second TRP. The communications manager 1120 is capable of, configured to, or operable to support a means for monitoring one or both of the first downlink control information candidate and the second downlink control information candidate according to a linkage status of the first downlink control information candidate and the second downlink control information candidate, where the linkage status is based on a first DTX status of the first TRP, a second DTX status of the second TRP, a downlink control information format, or a combination thereof.

By including or configuring the communications manager 1120 in accordance with examples as described herein, the device 1105 may support techniques for improved communication reliability, more efficient utilization of communication resources, and improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of techniques for linking downlink control information candidates across multiple TRPs with cell DTX operations as described herein, or the at least one processor 1140 and the at least one memory 1130 may be otherwise configured to, individually or collectively, perform or support such operations.

Figure 12:
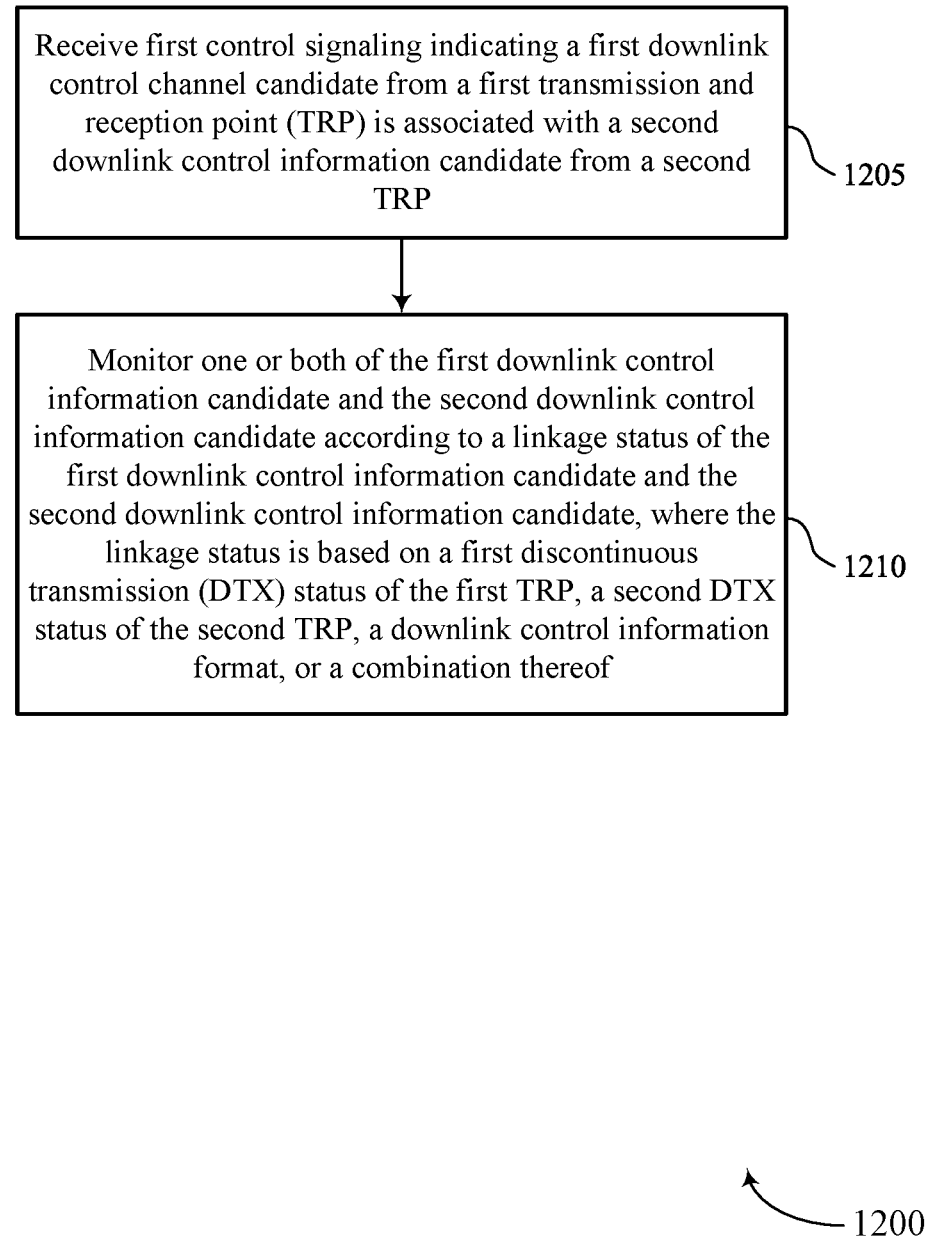
FIGS. 12 and 13 show flowcharts illustrating methods that support techniques for linking downlink control information candidates across multiple TRPs with cell DTX operations in accordance with one or more aspects of the present disclosure.

FIG. 12 shows a flowchart illustrating a method 1200 that supports techniques for linking downlink control information candidates across multiple TRPs with cell DTX operations in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1205, the method may include receiving first control signaling indicating a first downlink control information candidate from a first TRP is associated with a second downlink control information candidate from a second TRP. The operations of block 1205 may be performed in accordance with examples as disclosed herein. In some examples, aspects of the operations of 1205 may be performed by a linked candidates manager 1025 as described with reference to FIG. 10.

At 1210, the method may include monitoring one or both of the first downlink control information candidate and the second downlink control information candidate according to a linkage status of the first downlink control information candidate and the second downlink control information candidate, where the linkage status is based on a first DTX status of the first TRP, a second DTX status of the second TRP, a downlink control information format, or a combination thereof. The operations of block 1210 may be performed in accordance with examples as disclosed herein. In some examples, aspects of the operations of 1210 may be performed by a monitor candidate manager 1030 as described with reference to FIG. 10.

Figure 13:
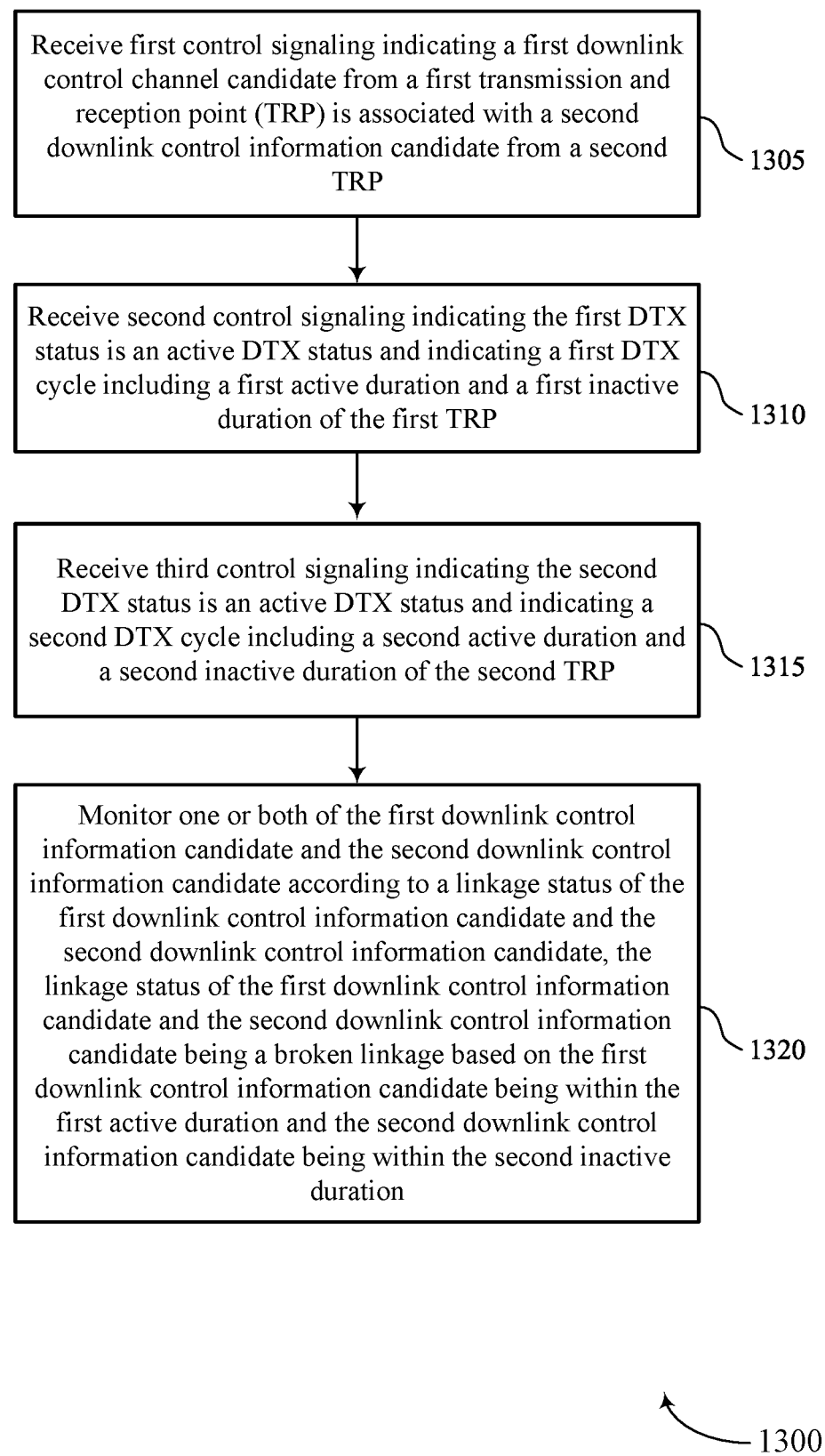

FIG. 13 shows a flowchart illustrating a method 1300 that supports techniques for linking downlink control information candidates across multiple TRPs with cell DTX operations in accordance with aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1305, the method may include receiving first control signaling indicating a first downlink control information candidate from a first TRP is associated with a second downlink control information candidate from a second TRP. The operations of block 1305 may be performed in accordance with examples as disclosed herein. In some examples, aspects of the operations of 1305 may be performed by a linked candidates manager 1025 as described with reference to FIG. 10.

At 1310, the method may include receiving second control signaling indicating the first DTX status is an active DTX status and indicating a first DTX cycle including a first active duration and a first inactive duration of the first TRP. The operations of block 1310 may be performed in accordance with examples as disclosed herein. In some examples, aspects of the operations of 1310 may be performed by a first DTX status manager 1035 as described with reference to FIG. 10.

At 1315, the method may include receiving third control signaling indicating the second DTX status is an active DTX status and indicating a second DTX cycle including a second active duration and a second inactive duration of the second TRP. The operations of block 1315 may be performed in accordance with examples as disclosed herein. In some examples, aspects of the operations of 1315 may be performed by a second DTX status manager 1040 as described with reference to FIG. 10.

At 1320, the method may include monitoring one or both of the first downlink control information candidate and the second downlink control information candidate according to a linkage status of the first downlink control information candidate and the second downlink control information candidate, where the linkage status of the first downlink control information candidate and the second downlink control information candidate being a broken linkage based on the first downlink control information candidate being within the first active duration and the second downlink control information candidate being within the second inactive duration. The operations of block 1320 may be performed in accordance with examples as disclosed herein. In some examples, aspects of the operations of 1320 may be performed by a monitor candidate manager 1030 as described with reference to FIG. 10.

The following provides an overview of aspects of the present disclosure:

Aspect 1: A method for wireless communications by a UE, comprising: receiving first control signaling indicating a first downlink control channel candidate from a first transmission and reception point (TRP) is associated with a second downlink control information candidate from a second TRP; and monitoring one or both of the first downlink control information candidate and the second downlink control information candidate according to a linkage status of the first downlink control information candidate and the second downlink control information candidate, wherein the linkage status is based on a first discontinuous transmission (DTX) status of the first TRP, a second DTX status of the second TRP, a downlink control information format, or a combination thereof.

Aspect 2: The method of aspect 1, further comprising: receiving second control signaling indicating the first DTX status is an active DTX status, the linkage status of the first downlink control information candidate and the second downlink control information candidate being a broken linkage based on the active DTX status.

Aspect 3: The method of aspect 2, further comprising: receiving third control signaling indicating a first DTX cycle comprising an active duration and an inactive duration of the first TRP such that the first downlink control information candidate is within the inactive duration; wherein monitoring one or both of the first downlink control information candidate and the second downlink control information candidate comprises monitoring the second downlink control information candidate, wherein the first downlink control information candidate is not linked with the second downlink control information candidate based on the broken linkage.

Aspect 4: The method of any of aspects 2 through 3, wherein monitoring one or both of the first downlink control information candidate and the second downlink control information candidate further comprises: monitoring the first downlink control information candidate and the second downlink control information candidate, wherein the first downlink control information candidate is not linked with the second downlink control information candidate based on the broken linkage.

Aspect 5: The method of aspect 1, further comprising: receiving second control signaling indicating the first DTX status is an active DTX status and indicating a first DTX cycle comprising a first active duration and a first inactive duration of the first TRP; and receiving third control signaling indicating the second DTX status is an active DTX status and indicating a second DTX cycle comprising a second active duration and a second inactive duration of the second TRP; the linkage status of the first downlink control information candidate and the second downlink control information candidate being a maintained linkage based on the first downlink control information candidate being within the first active duration and the second downlink control information candidate being within the second active duration.

Aspect 6: The method of aspect 5, wherein monitoring one or both of the first downlink control information candidate and the second downlink control information candidate further comprises: monitoring the first downlink control information candidate and the second downlink control information candidate, wherein the first downlink control information candidate is linked with the second downlink control information candidate based on the maintained linkage.

Aspect 7: The method of aspect 1, further comprising: receiving second control signaling indicating the first DTX status is an active DTX status and indicating a first DTX cycle comprising a first active duration and a first inactive duration of the first TRP; and receiving third control signaling indicating the second DTX status is an active DTX status and indicating a second DTX cycle comprising a second active duration and a second duration of the second TRP; the linkage status of the first downlink control information candidate and the second downlink control information candidate being a maintained linkage based on the first downlink control information candidate being within the first active duration and the second downlink control information candidate being within the second inactive duration.

Aspect 8: The method of aspect 7, wherein monitoring one or both of the first downlink control information candidate and the second downlink control information candidate comprises: monitoring the first downlink control information candidate and the second downlink control information candidate, wherein the first downlink control information candidate is linked with the second downlink control information candidate based on the maintained linkage.

Aspect 9: The method of any of aspect 1, further comprising: receiving second control signaling indicating the first DTX status is an active DTX status and indicating a first DTX cycle comprising a first active duration and a first inactive duration of the first TRP; and receiving third control signaling indicating the second DTX status is an active DTX status and indicating a second DTX cycle comprising a second active duration and a second duration of the second TRP; the linkage status of the first downlink control information candidate and the second downlink control information candidate being a broken linkage based on the first downlink control information candidate being within the first active duration and the second downlink control information candidate being within the second inactive duration.

Aspect 10: The method of aspect 9, wherein monitoring one or both of the first downlink control information candidate and the second downlink control information candidate further comprises: monitoring the first downlink control information candidate; and dropping the second downlink control information candidate, wherein the first downlink control information candidate is not linked with the second downlink control information candidate based on the broken linkage.

Aspect 11: The method of any of aspect 1, further comprising: receiving second control signaling indicating the downlink control information format; and receiving third control signaling indicating the DTX status of the first TRP is an active DTX status; the linkage status of the first downlink control information candidate and the second downlink control information candidate being a maintained linkage based on the downlink control information format.

Aspect 12: The method of aspect 1, further comprising: receiving second control signaling indicating the downlink control information format; and receiving third control signaling indicating the DTX status of the first TRP is an active DTX status; the linkage status of the first downlink control information candidate and the second downlink control information candidate being a broken linkage based on the downlink control information format.

Aspect 13: The method of any of aspect 1, further comprising: receiving second control signaling indicating the downlink control information format; receiving third control signaling indicating the first DTX status is an active DTX status and indicating a first DTX cycle comprising a first active duration and a first inactive duration of the first TRP; and receiving fourth control signaling indicating the second DTX status is an active DTX status and indicating a second DTX cycle comprising a second active duration and a second inactive durations of the second TRP; the linkage status of the first downlink control information candidate and the second downlink control information candidate being a maintained linkage based on the downlink control information format and on the first downlink control information candidate being within the first active duration and the second downlink control information candidate being within the second inactive duration.

Aspect 14: The method of any of aspect 1, further comprising: receiving second control signaling indicating the downlink control information format; receiving third control signaling indicating the first DTX status is an active DTX status and indicating a first DTX cycle comprising a first active duration and a first inactive duration of the first TRP; and receiving fourth control signaling indicating the second DTX status is an active DTX status and indicating a second DTX cycle comprising a second active duration and a second inactive durations of the second TRP; the linkage status of the first downlink control information candidate and the second downlink control information candidate being a broken linkage based on the downlink control information format and based on the first downlink control information candidate being within the first active duration and the second downlink control information candidate being within the second inactive duration.

Aspect 15: A UE for wireless communications, comprising one or more memories storing processor-executable code, and one or more processors coupled with the one or more memories and individually or collectively operable to execute the code to cause the UE to perform a method of any of aspects 1 through 14.

Aspect 16: A UE for wireless communications, comprising at least one means for performing a method of any of aspects 1 through 14.

Aspect 17: A non-transitory computer-readable medium storing code for wireless communications, the code comprising instructions executable by a processor to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

one or more memories storing processor-executable code; and
   one or more processors coupled with the one or more memories and individually or collectively operable to execute the code to cause the UE to:
   receive first control signaling indicating a first downlink control information candidate from a first transmission and reception point (TRP) is associated with a second downlink control information candidate from a second TRP; and
   monitor one or both of the first downlink control information candidate and the second downlink control information candidate according to a linkage status of the first downlink control information candidate and the second downlink control information candidate, wherein the linkage status is based on a first discontinuous transmission (DTX) status of the first TRP, a second DTX status of the second TRP, a downlink control information format, or a combination thereof.

2. The UE of claim 1, wherein the one or more processors are individually or collectively further operable to execute the code to cause the UE to:
   receive second control signaling indicating the first DTX status is an active DTX status, the linkage status of the first downlink control information candidate and the second downlink control information candidate being a broken linkage based on the active DTX status.

3. The UE of claim 2, wherein the one or more processors are individually or collectively further operable to execute the code to cause the UE to:
   receive third control signaling indicating a first DTX cycle comprising an active duration and an inactive duration of the first TRP such that the first downlink control information candidate is within the inactive duration;
   wherein monitor one or both of the first downlink control information candidate and the second downlink control information candidate comprises monitoring the second downlink control information candidate, wherein the first downlink control information candidate is not linked with the second downlink control information candidate based on the broken linkage.

4. The UE of claim 2, wherein, to monitor one or both of the first downlink control information candidate and the second downlink control information candidate, the one or more processors are individually or collectively operable to execute the code to cause the UE to:
   monitor the first downlink control information candidate and the second downlink control information candidate, wherein the first downlink control information candidate is not linked with the second downlink control information candidate based on the broken linkage.

5. The UE of claim 1, wherein the one or more processors are individually or collectively further operable to execute the code to cause the UE to:
   receive second control signaling indicating the first DTX status is an active DTX status and indicating a first DTX cycle comprising a first active duration and a first inactive duration of the first TRP; and
   receive third control signaling indicating the second DTX status is an active DTX status and indicating a second DTX cycle comprising a second active duration and a second inactive duration of the second TRP; the linkage status of the first downlink control information candidate and the second downlink control information candidate being a maintained linkage based on the first downlink control information candidate being within the first active duration and the second downlink control information candidate being within the second active duration.

6. The UE of claim 5, wherein, to monitor one or both of the first downlink control information candidate and the second downlink control information candidate, the one or more processors are individually or collectively operable to execute the code to cause the UE to:
monitor the first downlink control information candidate and the second downlink control information candidate, wherein the first downlink control information candidate is linked with the second downlink control information candidate based on the maintained linkage.

7. The UE of claim 1, wherein the one or more processors are individually or collectively further operable to execute the code to cause the UE to:
receive second control signaling indicating the first DTX status is an active DTX status and indicating a first DTX cycle comprising a first active duration and a first inactive duration of the first TRP; and
receive third control signaling indicating the second DTX status is an active DTX status and indicating a second DTX cycle comprising a second active duration and a second inactive duration of the second TRP; the linkage status of the first downlink control information candidate and the second downlink control information candidate being a maintained linkage based on the first downlink control information candidate being within the first active duration and the second downlink control information candidate being within the second inactive duration.

8. The UE of claim 7, wherein, to monitor one or both of the first downlink control information candidate and the second downlink control information candidate, the one or more processors are individually or collectively operable to execute the code to cause the UE to:
monitor the first downlink control information candidate and the second downlink control information candidate, wherein the first downlink control information candidate is linked with the second downlink control information candidate based on the maintained linkage.

9. The UE of claim 1, wherein the one or more processors are individually or collectively further operable to execute the code to cause the UE to:
receive second control signaling indicating the first DTX status is an active DTX status and indicating a first DTX cycle comprising a first active duration and a first inactive duration of the first TRP; and
receive third control signaling indicating the second DTX status is an active DTX status and indicating a second DTX cycle comprising a second active duration and a second inactive duration of the second TRP; the linkage status of the first downlink control information candidate and the second downlink control information candidate being a broken linkage based on the first downlink control information candidate being within the first active duration and the second downlink control information candidate being within the second inactive duration.

10. The UE of claim 9, wherein, to monitor one or both of the first downlink control information candidate and the second downlink control information candidate, the one or more processors are individually or collectively operable to execute the code to cause the UE to:
monitor the first downlink control information candidate; and
drop the second downlink control information candidate, wherein the first downlink control information candidate is not linked with the second downlink control information candidate based on the broken linkage.

11. The UE of claim 1, wherein the one or more processors are individually or collectively further operable to execute the code to cause the UE to:
receive second control signaling indicating the downlink control information format; and
receive third control signaling indicating the first DTX status of the first TRP is an active DTX status; the linkage status of the first downlink control information candidate and the second downlink control information candidate being a maintained linkage based on the downlink control information format.

12. The UE of claim 1, wherein the one or more processors are individually or collectively further operable to execute the code to cause the UE to:
receive second control signaling indicating the downlink control information format; and
receive third control signaling indicating the first DTX status of the first TRP is an active DTX status; the linkage status of the first downlink control information candidate and the second downlink control information candidate being a broken linkage based on the downlink control information format.

13. The UE of claim 1, wherein the one or more processors are individually or collectively further operable to execute the code to cause the UE to:
receive second control signaling indicating the downlink control information format;
receive third control signaling indicating the first DTX status is an active DTX status and indicating a first DTX cycle comprising a first active duration and a first inactive duration of the first TRP; and
receive fourth control signaling indicating the second DTX status is an active DTX status and indicating a second DTX cycle comprising a second active duration and a second inactive duration of the second TRP; the linkage status of the first downlink control information candidate and the second downlink control information candidate being a maintained linkage based on the downlink control information format and on the first downlink control information candidate being within the first active duration and the second downlink control information candidate being within the second inactive duration.

14. The UE of claim 1, wherein the one or more processors are individually or collectively further operable to execute the code to cause the UE to:
receive second control signaling indicating the downlink control information format;
receive third control signaling indicating the first DTX status is an active DTX status and indicating a first DTX cycle comprising a first active duration and a first inactive duration of the first TRP; and
receive fourth control signaling indicating the second DTX status is an active DTX status and indicating a second DTX cycle comprising a second active duration and a second inactive duration of the second TRP; the linkage status of the first downlink control information candidate and the second downlink control information candidate being a broken linkage based on the downlink control information format and based on the first downlink control information candidate being within the first active duration and the second downlink control information candidate being within the second inactive duration.

15. A method for wireless communication by a user equipment (UE), comprising:
receiving first control signaling indicating a first downlink control information candidate from a first transmission and reception point (TRP) is associated with a second downlink control information candidate from a second TRP; and
monitoring one or both of the first downlink control information candidate and the second downlink control information candidate according to a linkage status of the first downlink control information candidate and the second downlink control information candidate, wherein the linkage status is based on a first discontinuous transmission (DTX) status of the first TRP, a second DTX status of the second TRP, a downlink control information format, or a combination thereof.

16. The method of claim 15, further comprising:
receiving second control signaling indicating the first DTX status is an active DTX status, the linkage status of the first downlink control information candidate and the second downlink control information candidate being a broken linkage based on the active DTX status.

17. The method of claim 16, further comprising:
receiving third control signaling indicating a first DTX cycle comprising an active duration and an inactive duration of the first TRP such that the first downlink control information candidate is within the inactive duration;
wherein monitoring one or both of the first downlink control information candidate and the second downlink control information candidate comprises monitoring the second downlink control information candidate, wherein the first downlink control information candidate is not linked with the second downlink control information candidate based on the broken linkage.

18. The method of claim 16, wherein monitoring one or both of the first downlink control information candidate and the second downlink control information candidate further comprises:
monitoring the first downlink control information candidate and the second downlink control information candidate, wherein the first downlink control information candidate is not linked with the second downlink control information candidate based on the broken linkage.

19. The method of claim 15, further comprising:
receiving second control signaling indicating the first DTX status is an active DTX status and indicating a first DTX cycle comprising a first active duration and a first inactive duration of the first TRP; and
receiving third control signaling indicating the second DTX status is an active DTX status and indicating a second DTX cycle comprising a second active duration and a second inactive duration of the second TRP; the linkage status of the first downlink control information candidate and the second downlink control information candidate being a maintained linkage based on the first downlink control information candidate being within the first active duration and the second downlink control information candidate being within the second active duration.

20. The method of claim 19, wherein monitoring one or both of the first downlink control information candidate and the second downlink control information candidate further comprises:
monitoring the first downlink control information candidate and the second downlink control information candidate, wherein the first downlink control information candidate is linked with the second downlink control information candidate based on the maintained linkage.

21. The method of claim 15, further comprising:
receiving second control signaling indicating the first DTX status is an active DTX status and indicating a first DTX cycle comprising a first active duration and a first inactive duration of the first TRP; and
receiving third control signaling indicating the second DTX status is an active DTX status and indicating a second DTX cycle comprising a second active duration and a second inactive duration of the second TRP; the linkage status of the first downlink control information candidate and the second downlink control information candidate being a maintained linkage based on the first downlink control information candidate being within the first active duration and the second downlink control information candidate being within the second inactive duration.

22. The method of claim 21, wherein monitoring one or both of the first downlink control information candidate and the second downlink control information candidate comprises:
monitoring the first downlink control information candidate and the second downlink control information candidate, wherein the first downlink control information candidate is linked with the second downlink control information candidate based on the maintained linkage.

23. The method of claim 15, further comprising:
receiving second control signaling indicating the first DTX status is an active DTX status and indicating a first DTX cycle comprising a first active duration and a first inactive duration of the first TRP; and
receiving third control signaling indicating the second DTX status is an active DTX status and indicating a second DTX cycle comprising a second active duration and a second inactive duration of the second TRP; the linkage status of the first downlink control information candidate and the second downlink control information candidate being a broken linkage based on the first downlink control information candidate being within the first active duration and the second downlink control information candidate being within the second inactive duration.

24. The method of claim 23, wherein monitoring one or both of the first downlink control information candidate and the second downlink control information candidate further comprises:
monitoring the first downlink control information candidate; and
dropping the second downlink control information candidate, wherein the first downlink control information candidate is not linked with the second downlink control information candidate based on the broken linkage.

25. The method of claim 15, further comprising:
receiving second control signaling indicating the downlink control information format; and receiving third control signaling indicating the first DTX status of the first TRP is an active DTX status; the linkage status of the first downlink control information candidate and the second downlink control information candidate being a maintained linkage based on the downlink control information format.

26. The method of claim 15, further comprising:
receiving second control signaling indicating the downlink control information format; and
receiving third control signaling indicating the first DTX status of the first TRP is an active DTX status; the linkage status of the first downlink control information candidate and the second downlink control information candidate being a broken linkage based on the downlink control information format.

27. The method of claim 15, further comprising:
receiving second control signaling indicating the downlink control information format;
receiving third control signaling indicating the first DTX status is an active DTX status and indicating a first DTX cycle comprising a first active duration and a first inactive duration of the first TRP; and
receiving fourth control signaling indicating the second DTX status is an active DTX status and indicating a second DTX cycle comprising a second active duration and a second inactive duration of the second TRP; the linkage status of the first downlink control information candidate and the second downlink control information candidate being a maintained linkage based on the downlink control information format and on the first downlink control information candidate being within the first active duration and the second downlink control information candidate being within the second inactive duration.

28. The method of claim 15, further comprising:
receiving second control signaling indicating the downlink control information format;
receiving third control signaling indicating the first DTX status is an active DTX status and indicating a first DTX cycle comprising a first active duration and a first inactive duration of the first TRP; and
receiving fourth control signaling indicating the second DTX status is an active DTX status and indicating a second DTX cycle comprising a second active duration and a second inactive duration of the second TRP; the linkage status of the first downlink control information candidate and the second downlink control information candidate being a broken linkage based on the downlink control information format and based on the first downlink control information candidate being within the first active duration and the second downlink control information candidate being within the second inactive duration.

29. A user equipment (UE) for wireless communication, comprising:
means for receiving first control signaling indicating a first downlink control information candidate from a first transmission and reception point (TRP) is associated with a second downlink control information candidate from a second TRP; and
means for monitoring one or both of the first downlink control information candidate and the second downlink control information candidate according to a linkage status of the first downlink control information candidate and the second downlink control information candidate, wherein the linkage status is based on a first discontinuous transmission (DTX) status of the first TRP, a second DTX status of the second TRP, a downlink control information format, or a combination thereof.

30. A non-transitory computer-readable medium storing code for wireless communication, the code comprising instructions executable by one or more processors to:
receive first control signaling indicating a first downlink control information candidate from a first transmission and reception point (TRP) is associated with a second downlink control information candidate from a second TRP; and
monitor one or both of the first downlink control information candidate and the second downlink control information candidate according to a linkage status of the first downlink control information candidate and the second downlink control information candidate, wherein the linkage status is based on a first discontinuous transmission (DTX) status of the first TRP, a second DTX status of the second TRP, a downlink control information format, or a combination thereof.

* * * * *